United States Patent
Ito et al.

(10) Patent No.: US 7,038,865 B2
(45) Date of Patent: May 2, 2006

(54) PHOTOGRAPHIC APPARATUS AND LENS BARREL

(75) Inventors: Yoshihiro Ito, Asaka (JP); Takehiko Senba, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 28 days.

(21) Appl. No.: 10/935,126

(22) Filed: Sep. 8, 2004

(65) Prior Publication Data

US 2005/0052759 A1    Mar. 10, 2005

(30) Foreign Application Priority Data

Sep. 9, 2003  (JP)  ............................. 2003-317076
Mar. 4, 2004  (JP)  ............................. 2004-060817

(51) Int. Cl.
  G02B 7/02  (2006.01)
  G02B 15/14  (2006.01)
(52) U.S. Cl. ...................... 359/819; 359/694; 359/813
(58) Field of Classification Search ................ 359/819, 359/813, 694–701; 396/583, 586, 323, 356
See application file for complete search history.

(56) References Cited

FOREIGN PATENT DOCUMENTS

| JP | 5-34769 A | 2/1993 |
|---|---|---|
| JP | 5-344396 A | 12/1993 |
| JP | 7-64152 A | 3/1995 |
| JP | 8-304875 A | 11/1996 |
| JP | 9-163240 A | 6/1997 |
| JP | 9-200591 A | 7/1997 |
| JP | 2001-61165 A | 3/2001 |
| JP | 2003-315861 A | 11/2003 |

*Primary Examiner*—Loha Ben
(74) *Attorney, Agent, or Firm*—Sughrue Mion, PLLC

(57) ABSTRACT

To provide a digital camera which is thinner than conventional when a lens barrel is collapsed, and is improved in suppression of degradation of image quality due to dust or the like introduced into the lens barrel. A lens barrel has: an optical-member advancement/retraction mechanism that retracts any of plural optical members from an optical axis for picture taking when the lens barrel is collapsed, and advances the optical member, which is retracted when the lens barrel is collapsed, onto the optical axis for picture taking when the lens barrel is extended; and a cleaning member that cleans at least either of the optical member or one, which is adjacent to the optical member, of the plural optical members and a solid-state image pickup section as a result of retracting or advancing the optical member by the optical-member retraction/advancement mechanism.

18 Claims, 26 Drawing Sheets

PHOTOGRAPHIC APPARATUS AND LENS BARREL

BACKGROUND OF THE INVENTION

1. Field of the Invention

The present invention relates to a photographic apparatus that captures object light and generates an image signal, and a lens barrel that houses a picture-taking optical system and can be extended and collapsed.

2. Description of the Related Art

In recent years, in addition to conventional cameras that use silver films for taking pictures, digital cameras that use a solid-state image pickup device, such as a CCD image pickup device or MOS image pickup device, have rapidly become widespread. The digital cameras form an object image on the solid-state image pickup device and generate an image signal.

The digital cameras, which are also required to have high portability as well as high picture-taking performance, are designed to house the collapsed lens barrel including the taking lens in the body so that the focal length can be changed, picture-taking can be achieved at a desired angle of view, and high portability can be assured.

Commonly-used taking lenses having a variable focal length are composed of three or more lens groups. In particular, widely used is a taking lens in which the lens group disposed at the rear end thereof along the optical axis serves as a focusing lens, and the focusing lens is displaced along the optical axis to achieve focus adjustment. Typically, a member that controls the quantity of light, such as a shutter or diaphragm, is additionally provided between the front lens group and the rear lens group or between the rear lens group and the focusing lens. As techniques relating to the present invention described later, there have been known shutters using an electrooptic element, such as a liquid crystal shutter using a liquid crystal (see patent references 1 and 2) and a PLZT shutter using a polarizing plate (see patent reference 3).

Such a camera that houses the collapsed lens barrel in the body has been made thinner by reducing the spaces between the lens groups or between the lens groups and the shutter are reduced to a minimum when the lens barrel is collapsed. However, this approach can make the digital camera thinner only to a limited extent.

There has been proposed an approach to vary the focal length in which the rear lens group is disposed on the optical axis in the telephoto mode and the rear lens group is displaced from the optical axis in the wide-angle mode (see the patent reference 4). However, this approach is intended only for varying the focal length and doesn't contribute to reducing the thickness of the camera.

Furthermore, compared to cameras which cannot change the length of the lens barrel, cameras of this type tend to introduce dust into the lens barrel, and the dust in the lens barrel may adhere to the taking lens to cause degradation of image quality.

To address this problem, there have been proposed techniques for cleaning the front surface of the taking lens provided on the front of the camera (see the patent references 5, 6 and 7). However, there have not been proposed measures against the dust in the lens barrel which adheres to the taking lens and causes degradation of image quality.

In addition, the patent reference 8 discloses a camera which has a lens barrel that incorporates a taking lens composed of plural lens groups and can be extended or collapsed and is reduced in thickness in the collapsed state by retracting, from the optical axis of the taking lens, the second lens group along the optical axis of the taking lens or both the first and second lens groups from the front along the optical axis.

However, the patent reference 8 doesn't propose any measure against the dust in the lens barrel which adheres to the taking lens and causes degradation of image quality.

Patent Document 1: Japanese Patent Laid-Open No. 9-163240

Patent Document 2: Japanese Patent Laid-Open No. 2001-61165

Patent Document 3: Japanese Patent Laid-Open No. 8-304875

Patent Document 4: Japanese Patent Laid-Open No. 5-34769 Patent Document 5: Japanese Patent Laid-Open No. 9-200591

Patent Document 6: Japanese Patent Laid-Open No. 7-64152

Patent Document 7: Japanese Patent Laid-Open No. 5-344396

Patent Document 8: Japanese Patent Laid-Open No. 2003-315861

SUMMARY OF THE INVENTION

In view of such circumstances, an object of the present invention is to provide a photographic apparatus and a lens barrel, the photographic apparatus being thinner than conventional when a lens barrel is collapsed and being improved in suppression of degradation of image quality due to dust or the like introduced into the lens barrel.

In order to attain the object described above, a photographic apparatus according to the present invention is a photographic apparatus that captures object light and generates an image signal, having:

a picture-taking optical system that has plural optical members including plural lens groups; and a lens barrel that houses the picture-taking optical system and is capable of being extended or collapsed, in which the lens barrel has:

an optical-member advancement/retraction mechanism that retracts any of the plural optical members from an optical axis for picture taking when the lens barrel is collapsed, and advances the optical member, which is retracted when the lens barrel is collapsed, onto the optical axis for picture taking when the lens barrel is extended; and a cleaning member that cleans at least one of the optical member and one of the plural optical members which is adjacent to the optical member as a result of retracting or advancing the optical member by the optical-member retraction/advancement mechanism.

In the photographic apparatus according to the present invention, any one of the plural optical members is retracted from the optical axis for picture taking to reduce the thickness thereof in the collapsed state, and at least one of the optical member advanced or retracted by the optical-member advancement/retraction mechanism and the optical member adjacent thereto is cleaned by the cleaning member. Thus, the digital camera according to the present invention can be made thinner than conventional in the collapsed state, and the optical members in the lens barrel can be cleaned.

Furthermore, the cleaning member may clean both the optical member retracted or advanced by the optical-member advancement/retraction mechanism and the one of the plural optical members which is adjacent to the optical member.

The optical-member advancement/retraction mechanism may advance or retract any one of the plural lens groups excluding a front lens group, which is located at the forefront to an object. Alternatively, the optical-member advancement/retraction mechanism may advance or retract, of the plural optical members, a light quantity controlling member that controls the quantity of object light passing therethrough.

The one of the plural optical members which is adjacent to the optical member retracted or advanced by the optical-member advancement/retraction mechanism may be one of the plural lens groups, a light quantity controlling member that controls the quantity of object light passing therethrough, or an optical member that is disposed in front of an image pickup device that receives object light through the picture-taking optical system and generates an image signal.

The optical-member advancement/retraction mechanism may have: an optical member guiding frame that moves along the optical axis for picture taking and positions the optical member retracted or advanced by the optical member advancement/retraction mechanism along the optical axis; and an optical member holding frame that holds the optical member and is rotatably pivotally supported on the optical member guiding frame, and at least one of the optical member guiding frame and the optical member holding frame may have the cleaning member.

With such an arrangement, the object described above can be attained with a simple mechanism.

Furthermore, the optical member disposed in front of the image pickup device preferably has a flat surface.

With such an arrangement, the burden on the cleaning member can be reduced.

The cleaning member may clean an optical member to be cleaned by contacting the optical member to be cleaned, or may attract extraneous matter adhering to the optical member to be cleaned without contacting the optical member to be cleaned.

If the cleaning member cleans the optical member by contacting it, the extraneous matter adhering to the optical member can be assuredly removed. If the cleaning member cleans the optical member without contacting it, the optical member can be protected against dirt or damage that is brought by the extraneous matter adhering to the optical member when it rubs against the optical member.

Preferably, the photographic apparatus according to the present invention further has a remover that removes extraneous matter adhering to the cleaning member during cleaning of the optical member from the cleaning member.

With such an arrangement, extraneous matter adhering to the cleaning member is removed by the remover, so that the extraneous matter is prevented from being brought onto the optical member again, and thus, cleaning can be done more effectively. The remover may be an adhesive body to remove the extraneous matter adhering to the cleaning member by contacting the cleaning member, or may be an electret for example that utilizes electrostatic force and attracts the extraneous matter adhering to the cleaning member without contacting the cleaning member.

In addition, in order to attain the object described above, a lens barrel according to the present invention is a lens barrel that houses a picture-taking optical system having plural optical members including plural lens groups and is capable of being extended or collapsed, the lens barrel having:

an optical-member advancement/retraction mechanism that retracts any of the plural optical members from an optical axis for picture taking when the lens barrel is collapsed, and advances the optical member, which is retracted when the lens barrel is collapsed, onto the optical axis for picture taking when the lens barrel is extended; and a cleaning member that cleans at least one of the optical member and one of the plural optical members which is adjacent to the optical member as a result of retracting or advancing the optical member by the optical-member retraction/advancement mechanism.

The cleaning member may clean both the optical member retracted or advanced by the optical-member advancement/retraction mechanism and the one of the plural optical members which is adjacent to the optical member.

In the lens barrel according to the present invention, the optical-member advancement/retraction mechanism has: an optical member guiding frame that moves along the optical axis for picture taking and positions the optical member retracted or advanced by the optical member advancement/retraction mechanism along the optical axis; and an optical member holding frame that holds the optical member and is rotatably pivotally supported on the optical member guiding frame, and at least one of the optical member guiding frame and the optical member holding frame has the cleaning member.

The cleaning member of the lens barrel may clean an optical member to be cleaned by contacting the optical member to be cleaned, or may attract extraneous matter adhering to the optical member to be cleaned without contacting the optical member to be cleaned.

Furthermore, the lens barrel according to the present invention preferably has a remover that removes extraneous matter adhering to the cleaning member during cleaning of the optical member from the cleaning member.

The lens barrel according to the present invention may be a separate lens unit, such as an interchangeable lens, or may incorporate an image pickup device.

According to present invention, reduction of thickness in the collapsed state and suppression of degradation of image quality due to dust or the like introduced into the lens barrel are improved.

Figure 8:
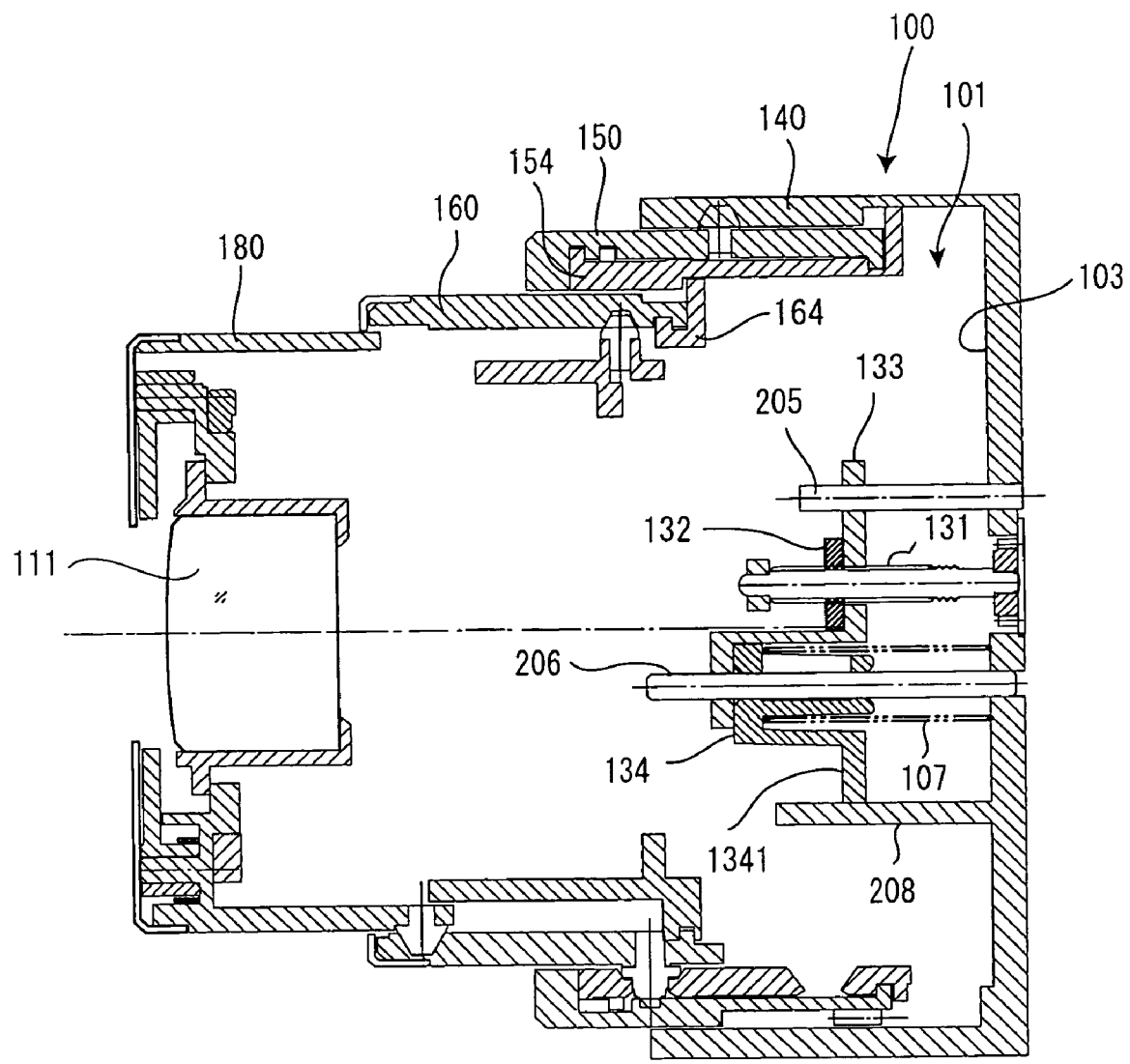
FIG. 8 is a cross-sectional view taken along the cutting-plane line D–D' in FIG. 4.
Figure 9:
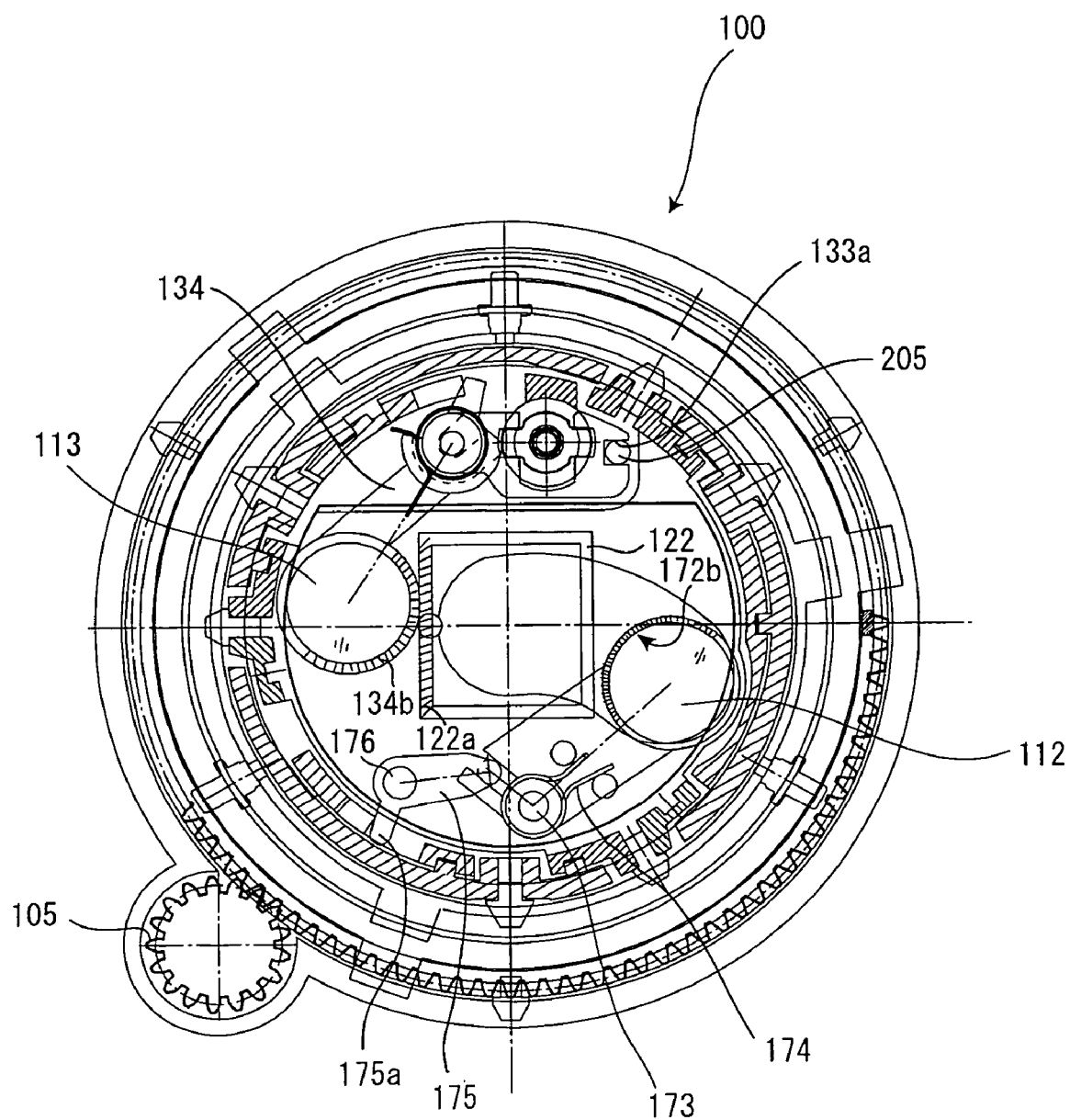
FIG. 9 is a schematic view of essential components of the lens barrel, in a collapsed state, of the digital camera according to the first embodiment shown in FIGS. 1 to 8 viewed along the optical axis, which is a cross-sectional view taken along the cutting-plane line E–E' in FIG. 11 described later.
Figure 10:
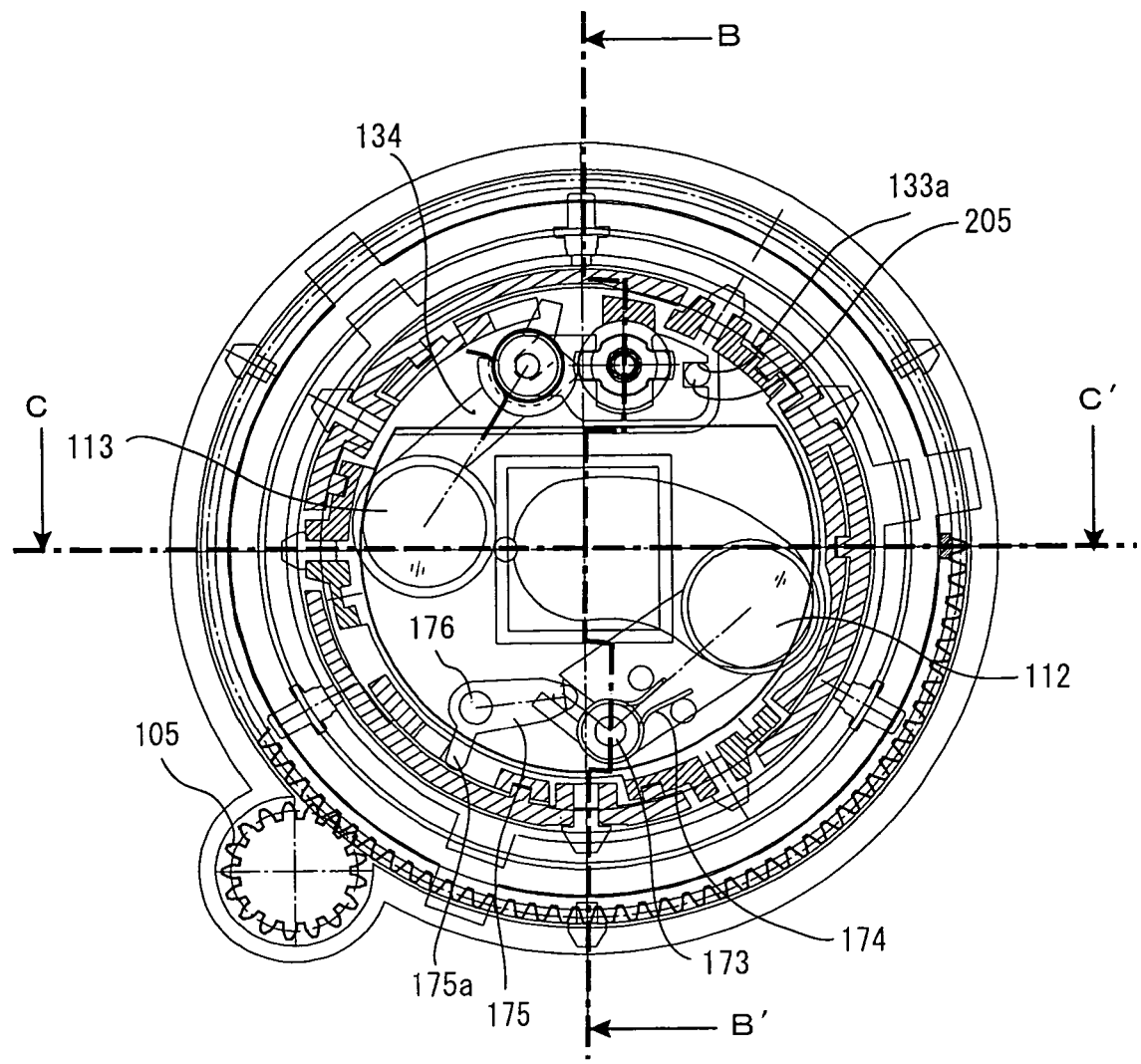
Figure 11:
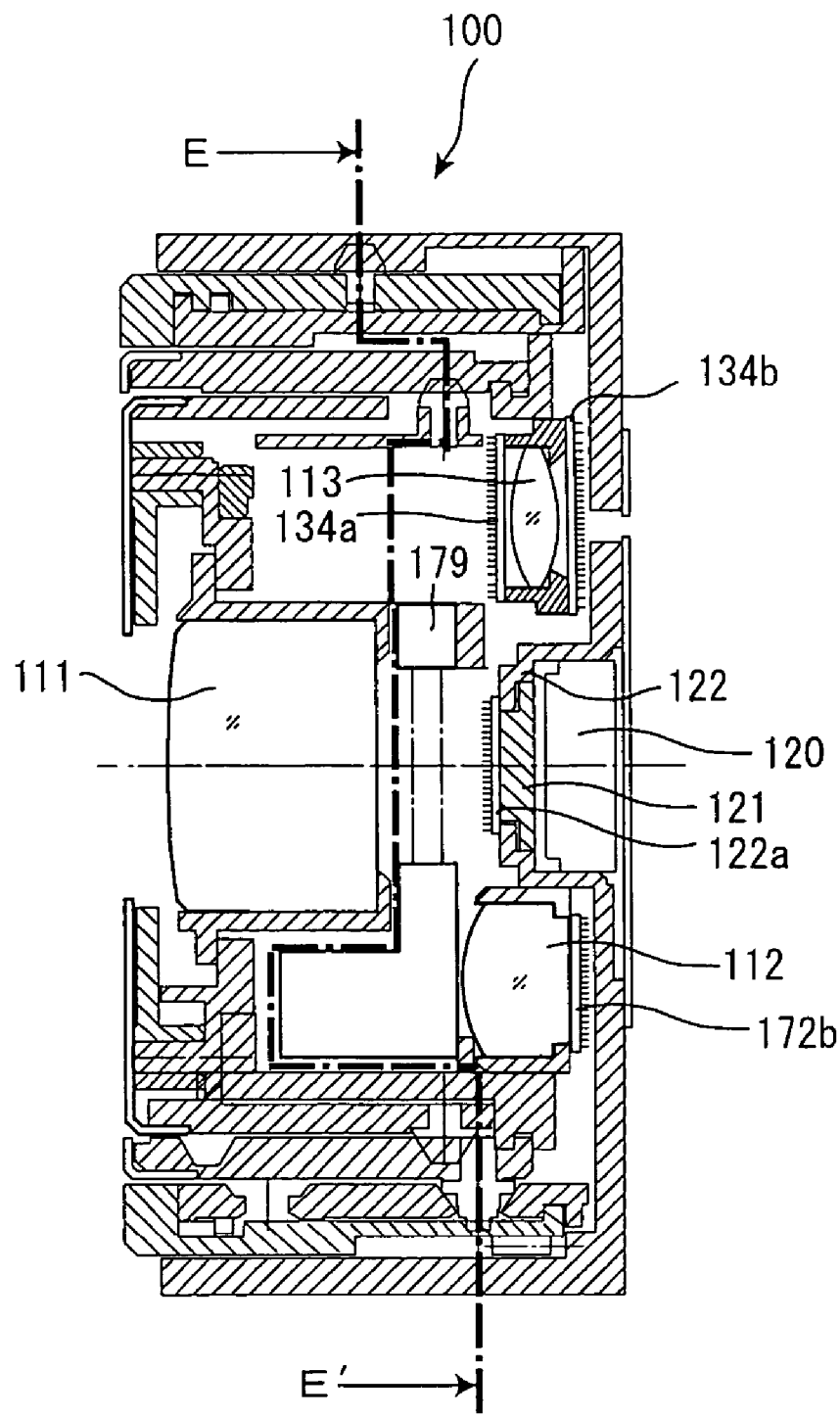
Figure 12:
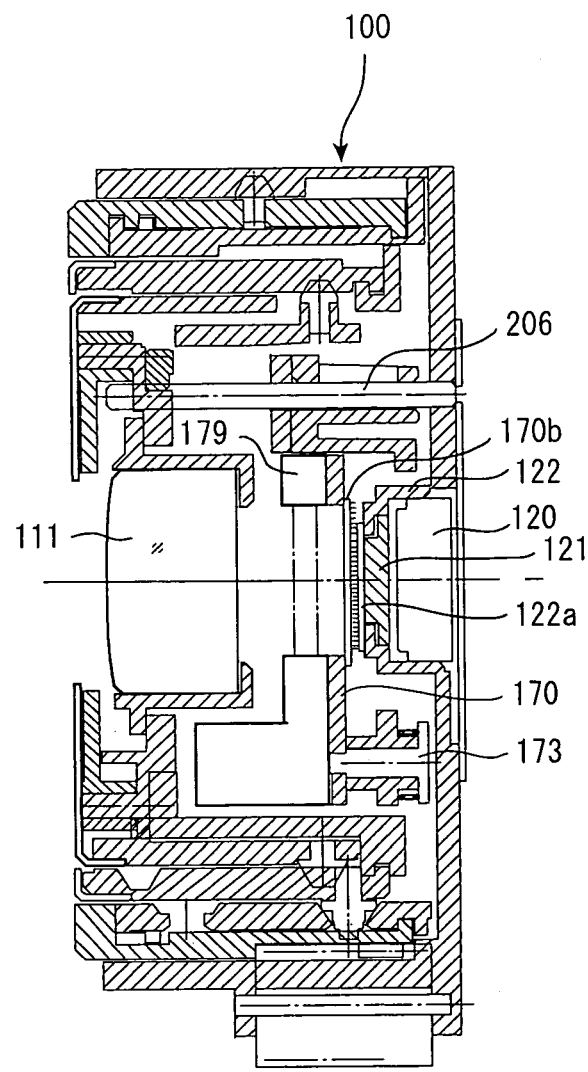
Figure 13:
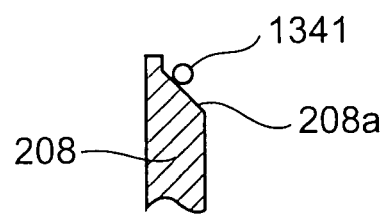
Figure 14:
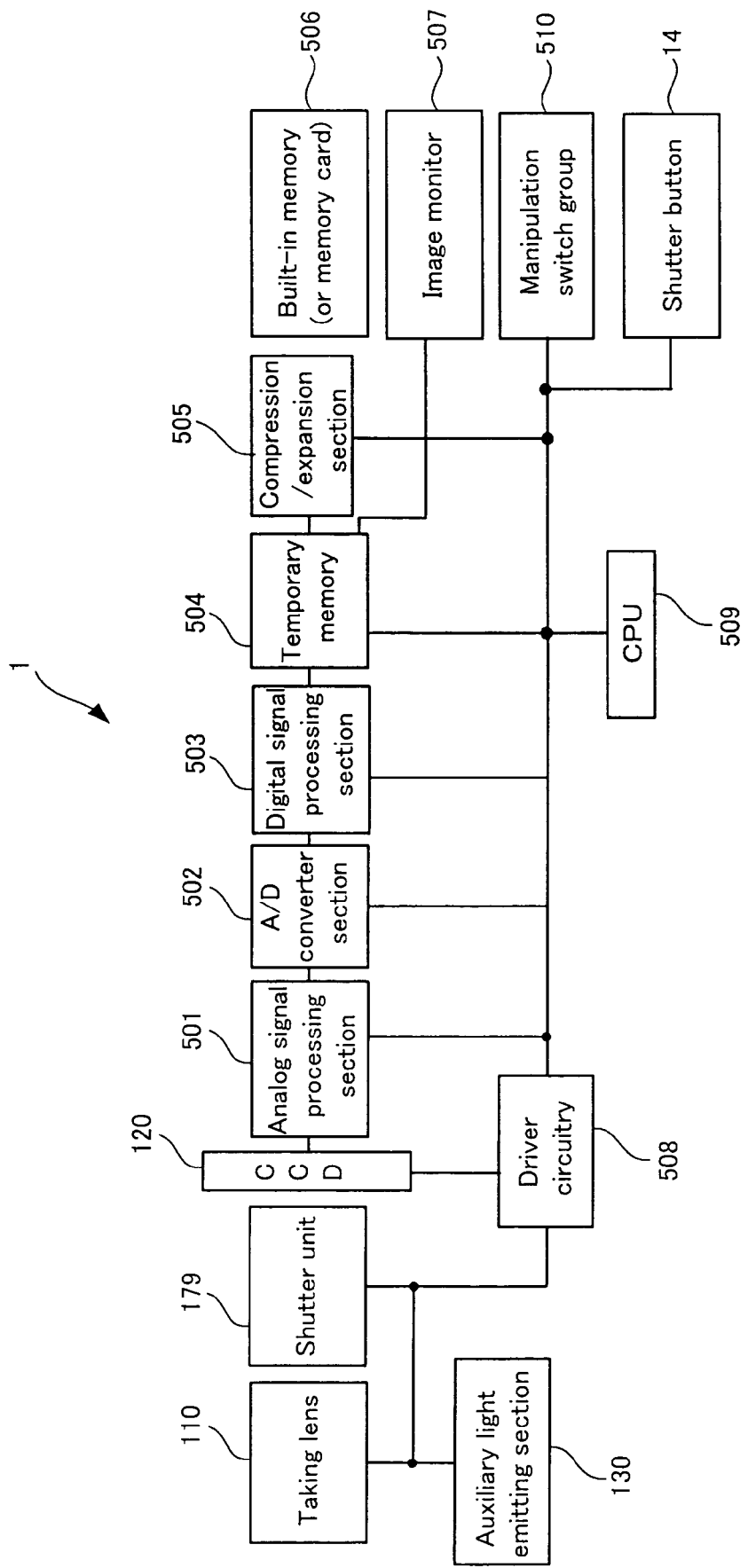
Figure 15:
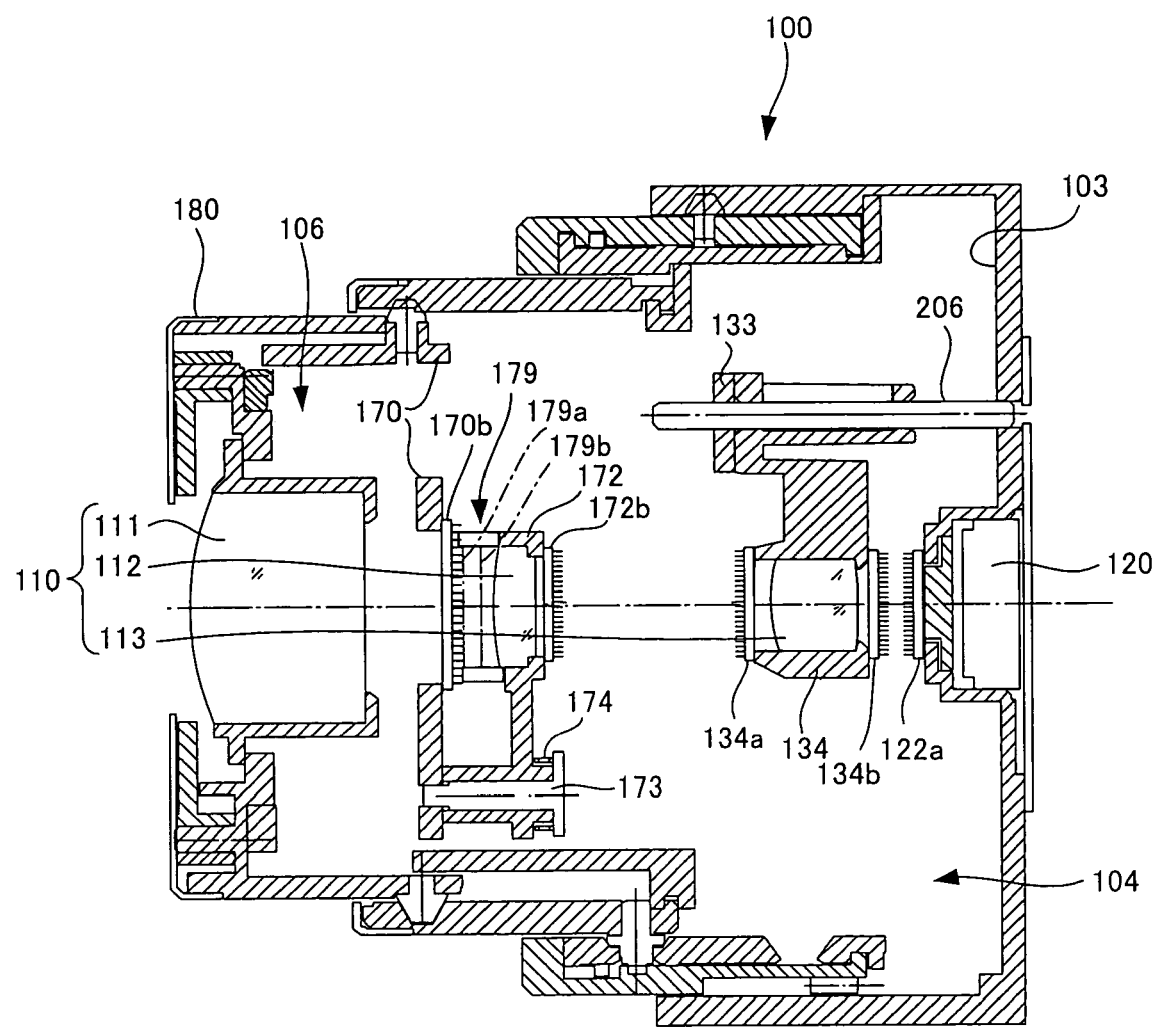
Figure 16:
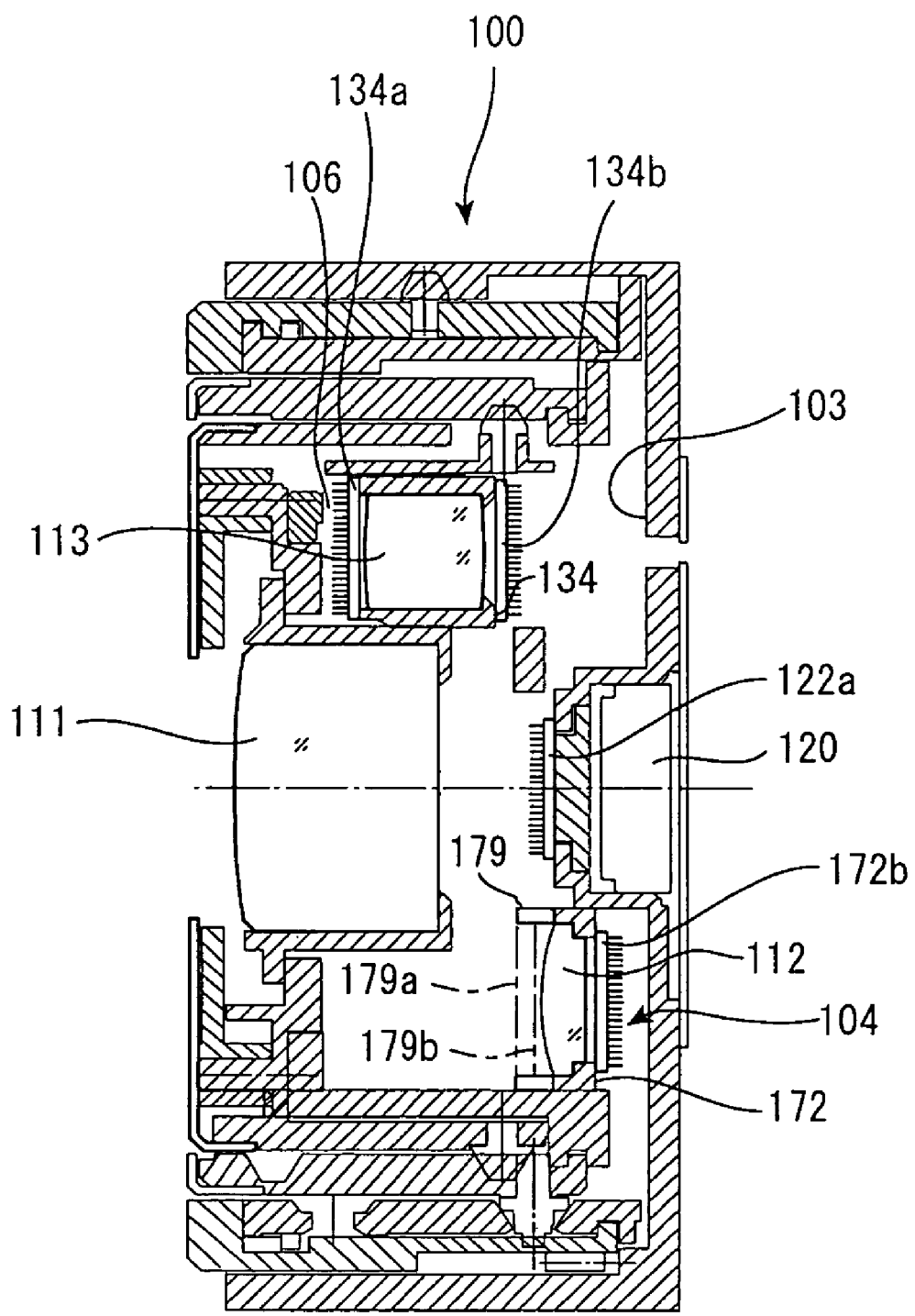
Figure 17:
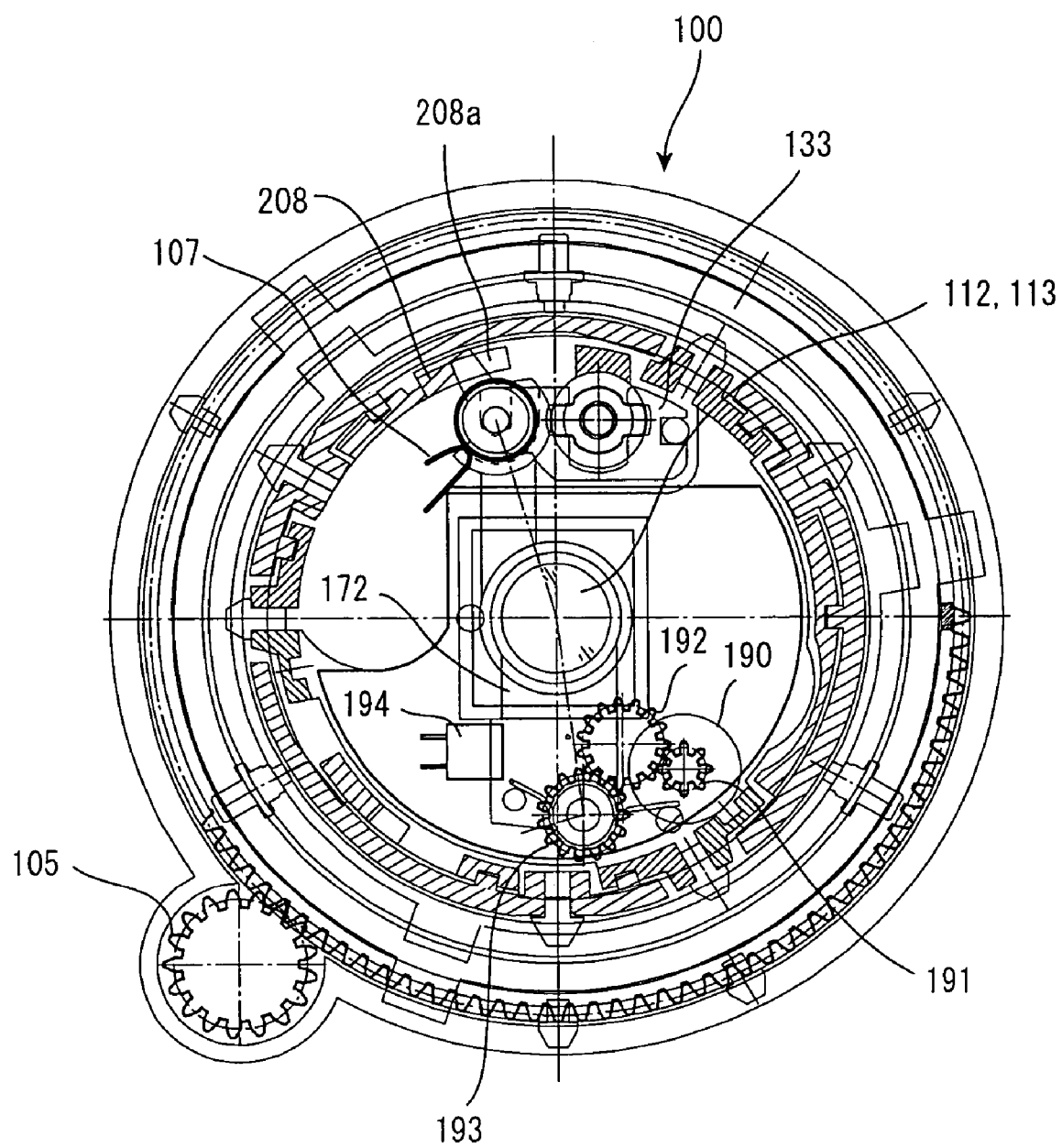
Figure 18:
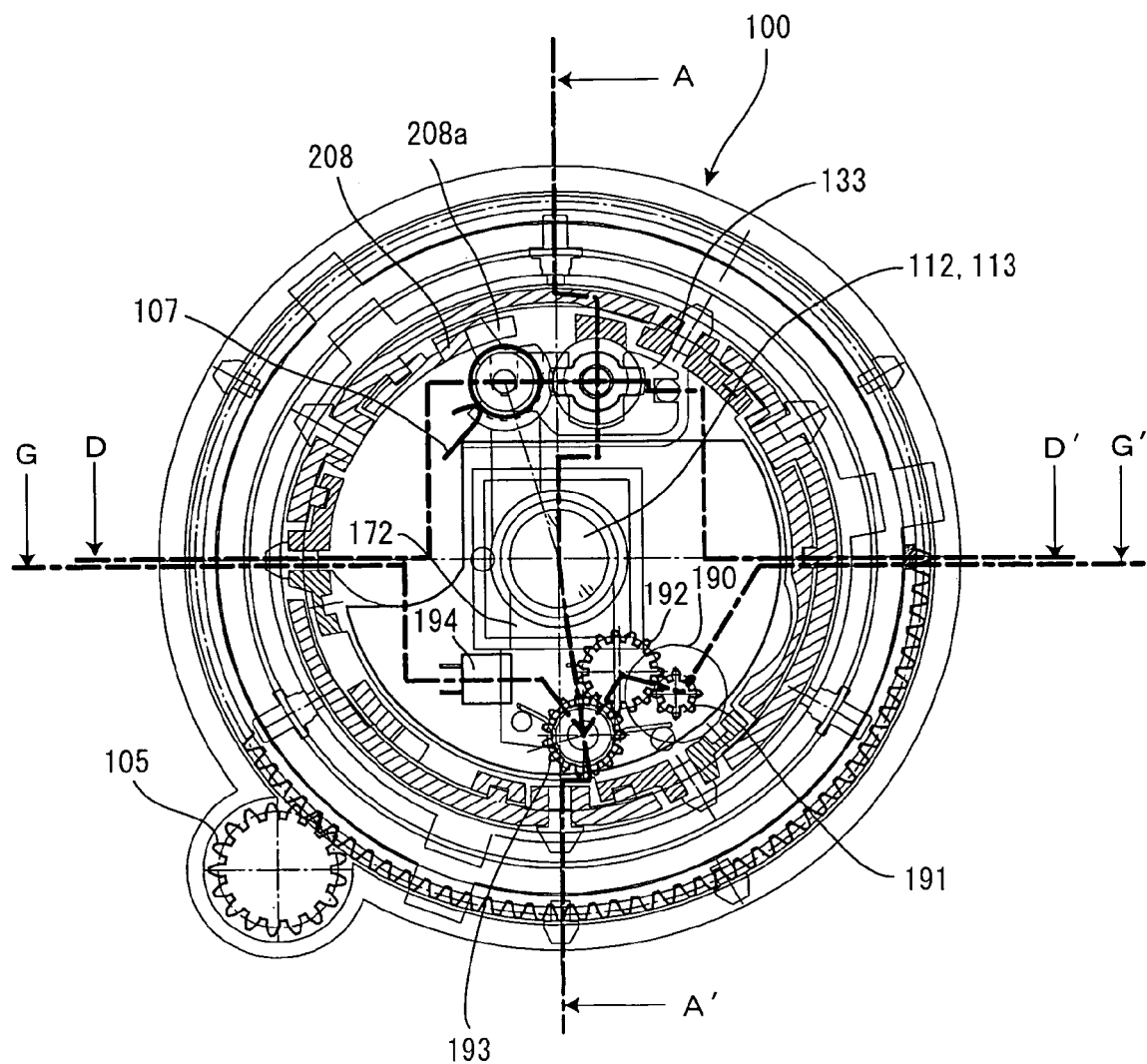
Figure 19:
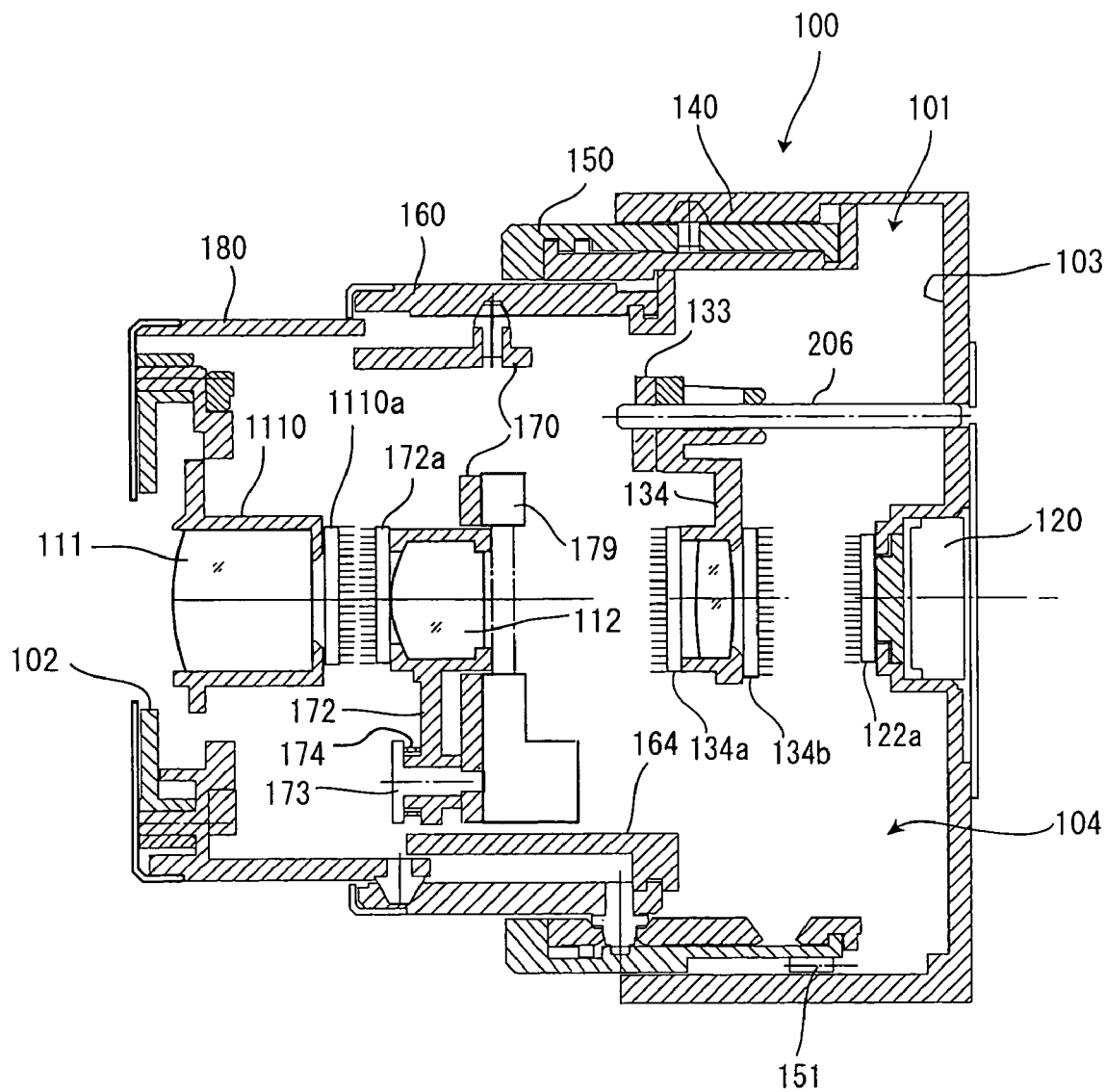
Figure 20:
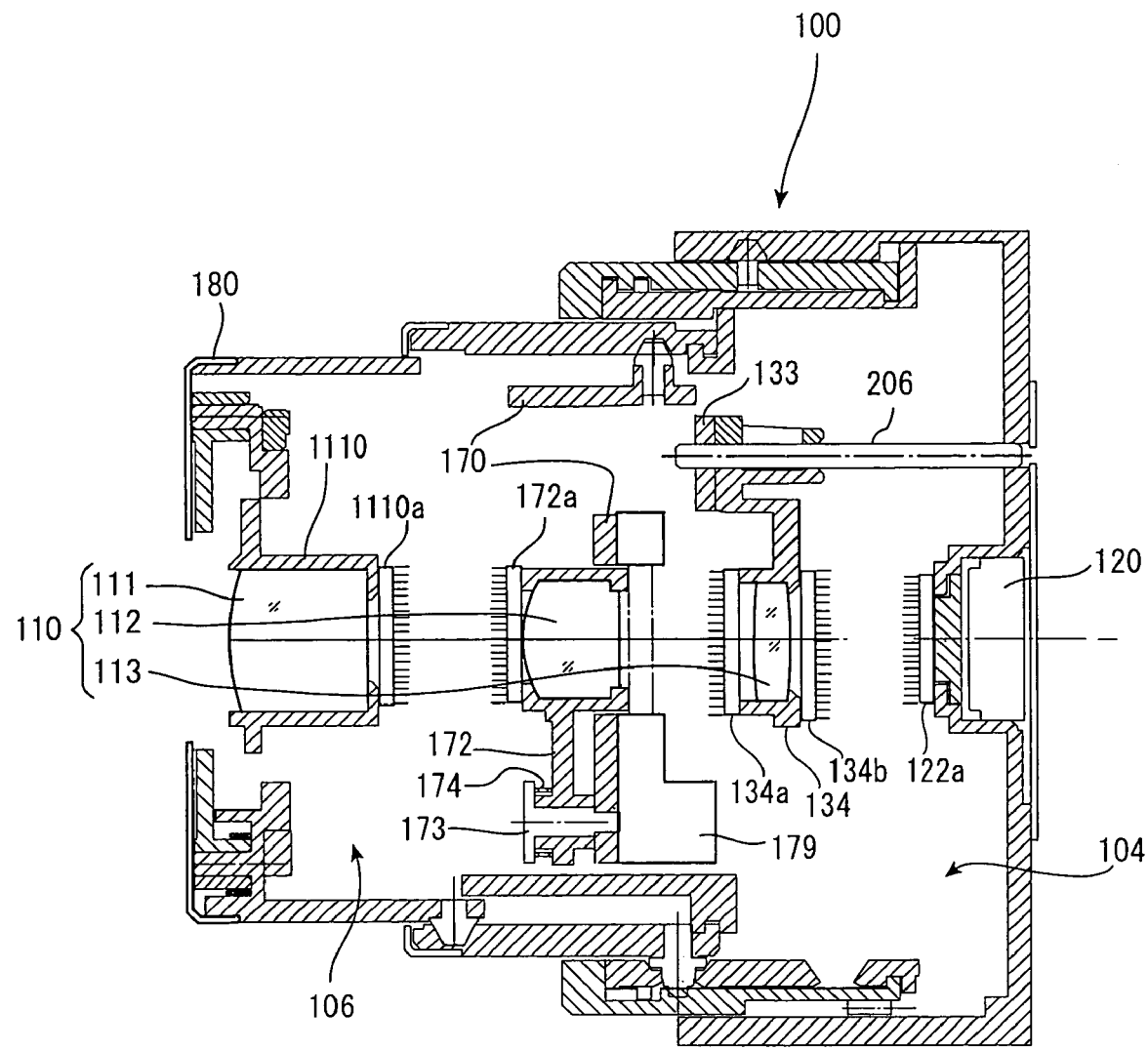
Figure 21:
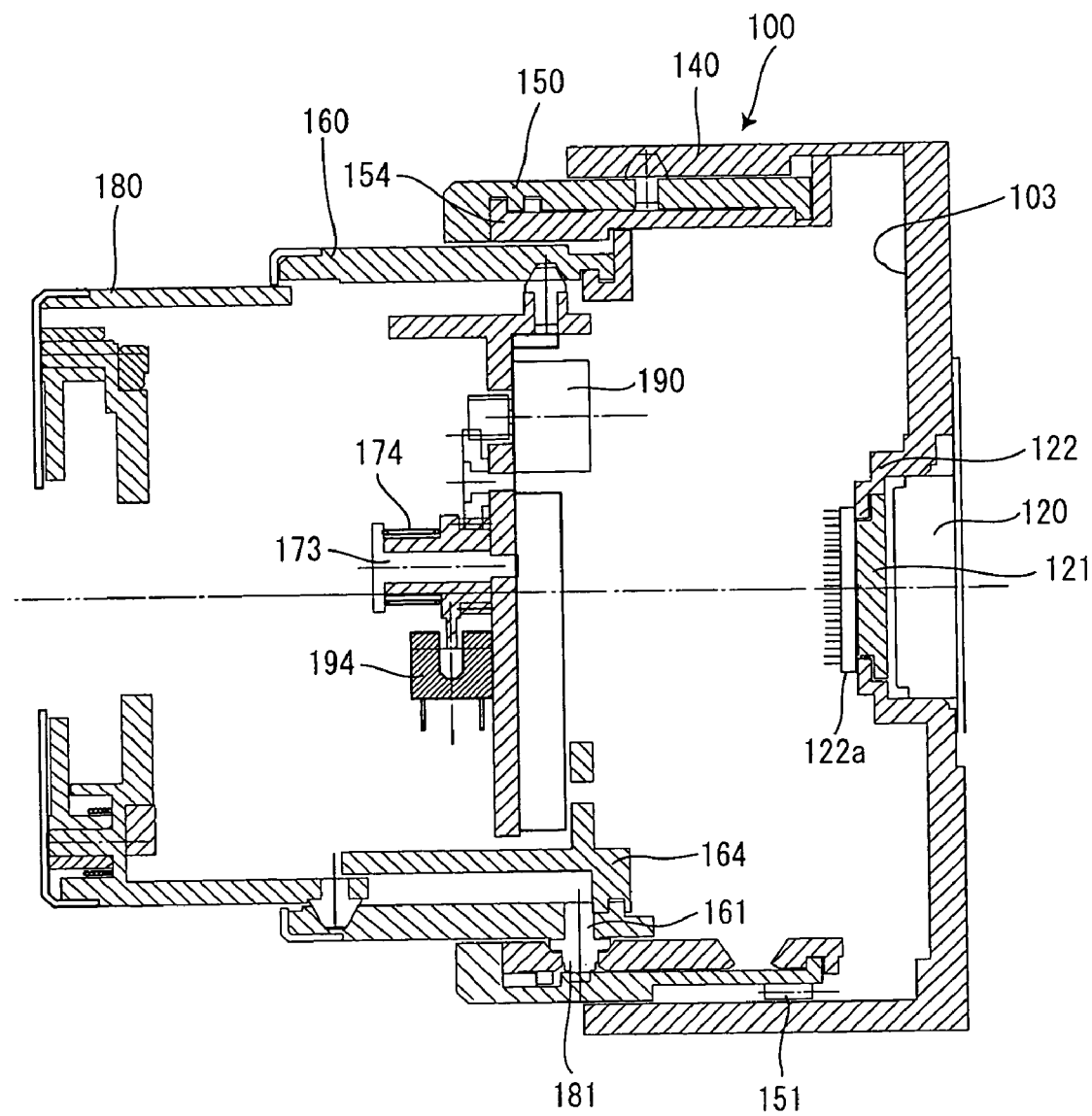
Figure 22:
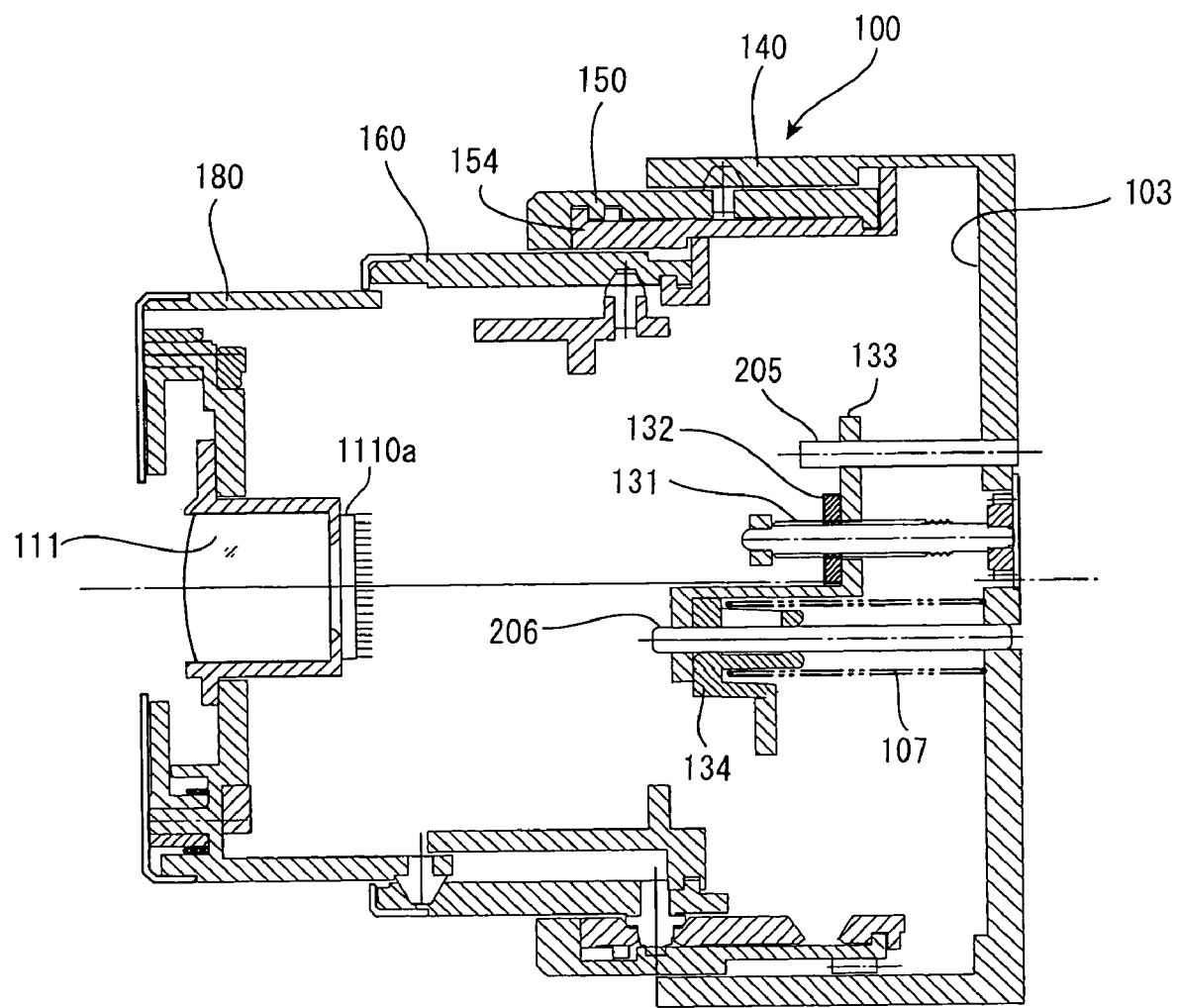
Figure 23:
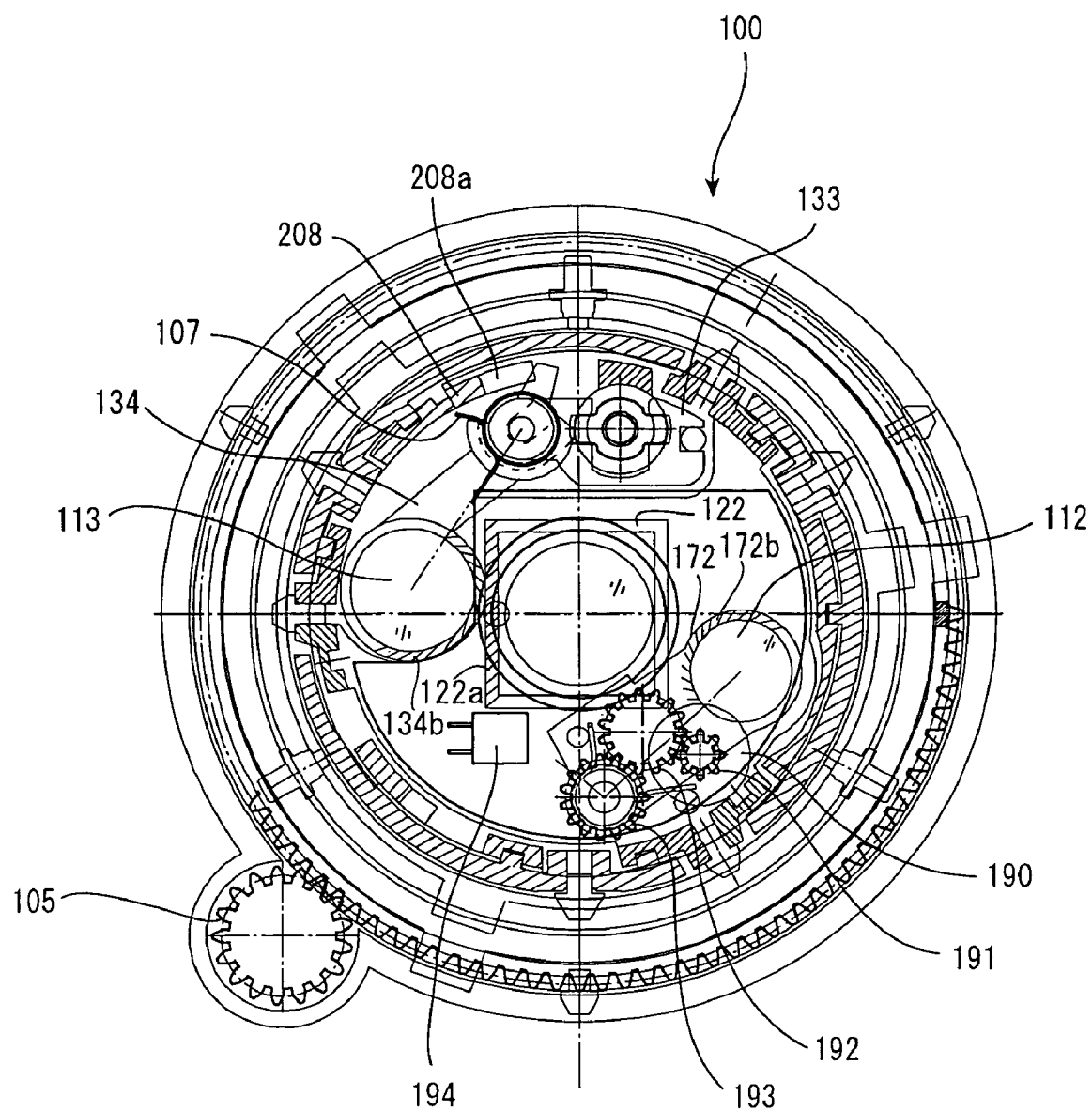
Figure 24:
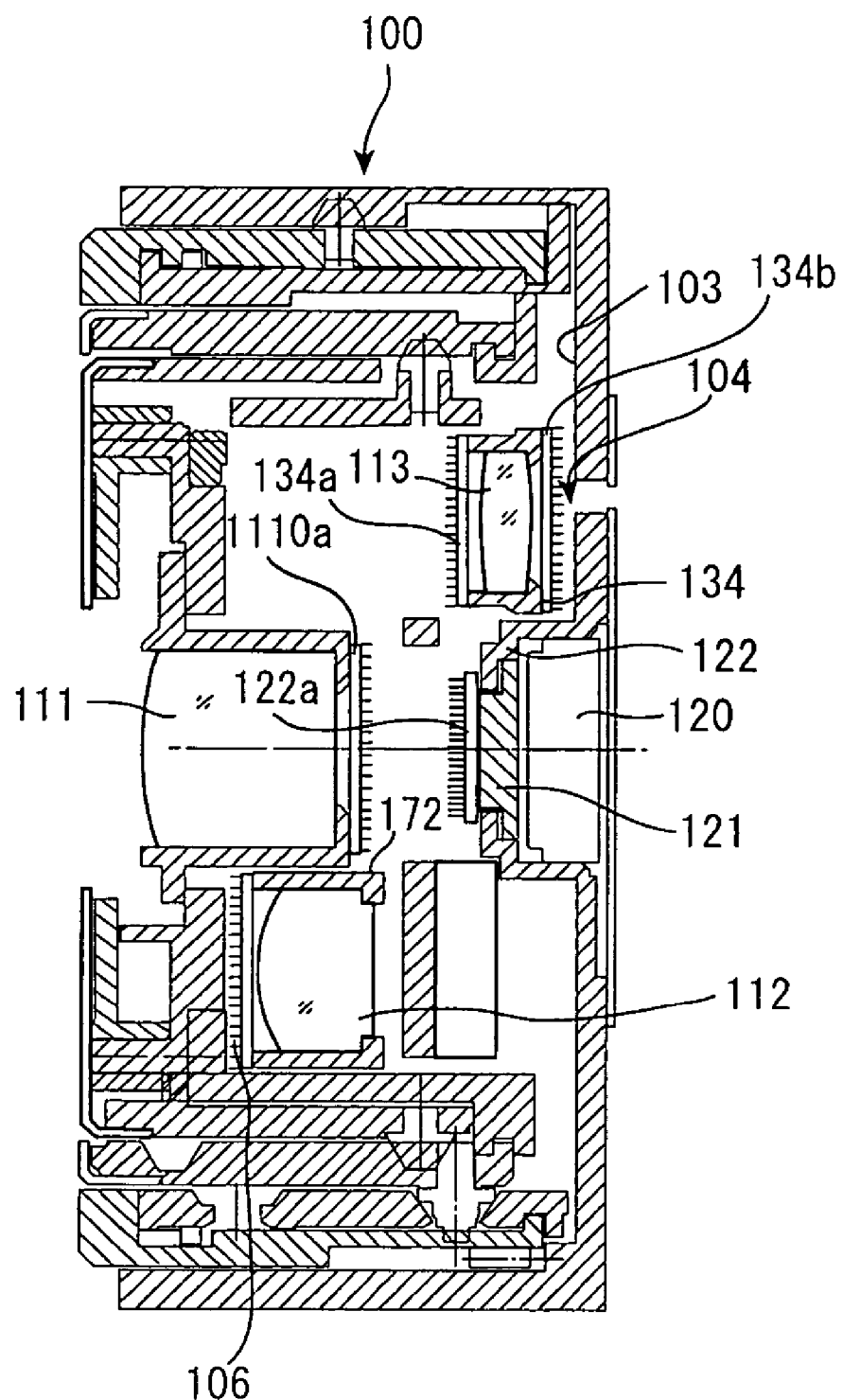
Figure 25:
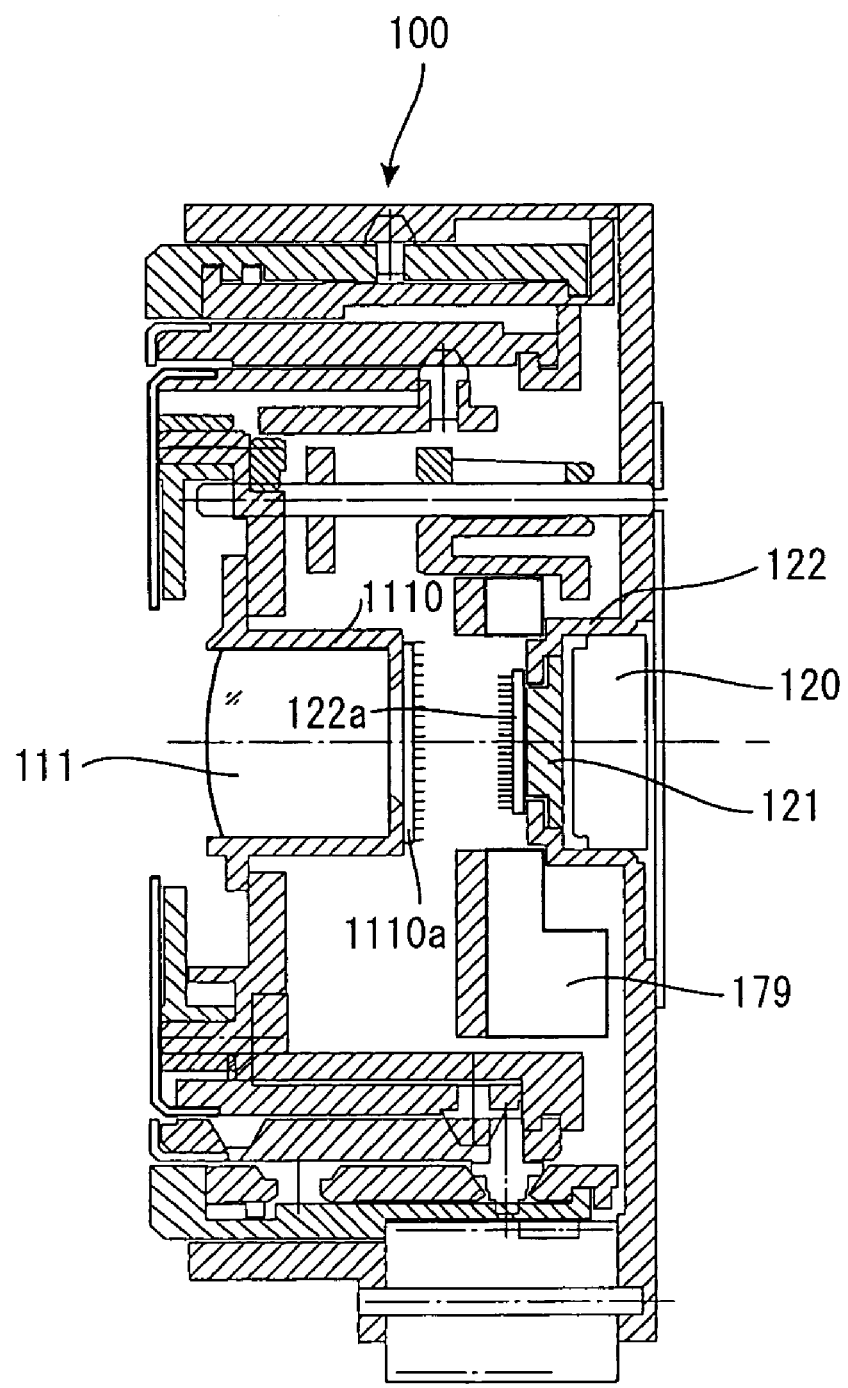
Figure 26:
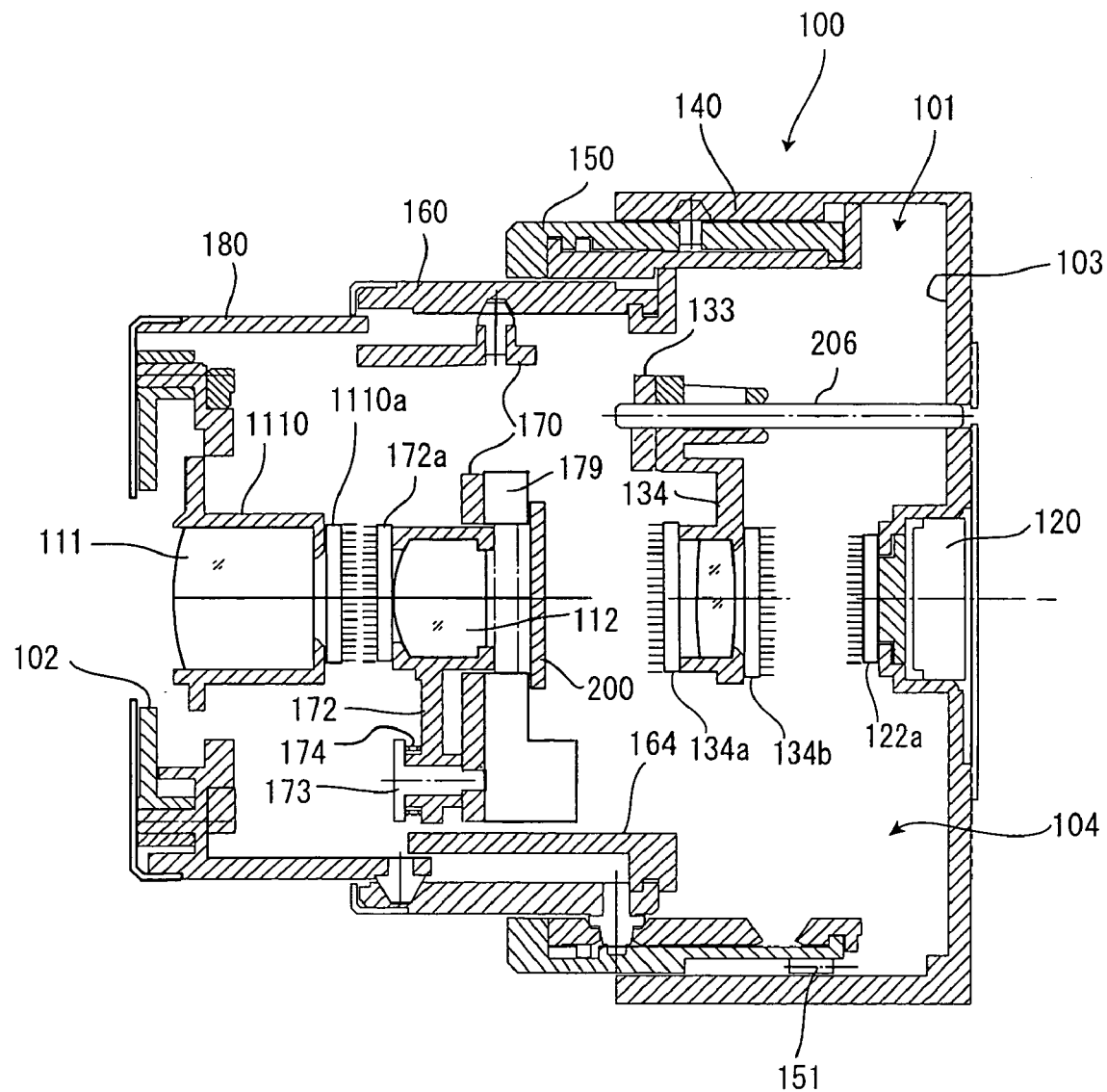
Figure 27:
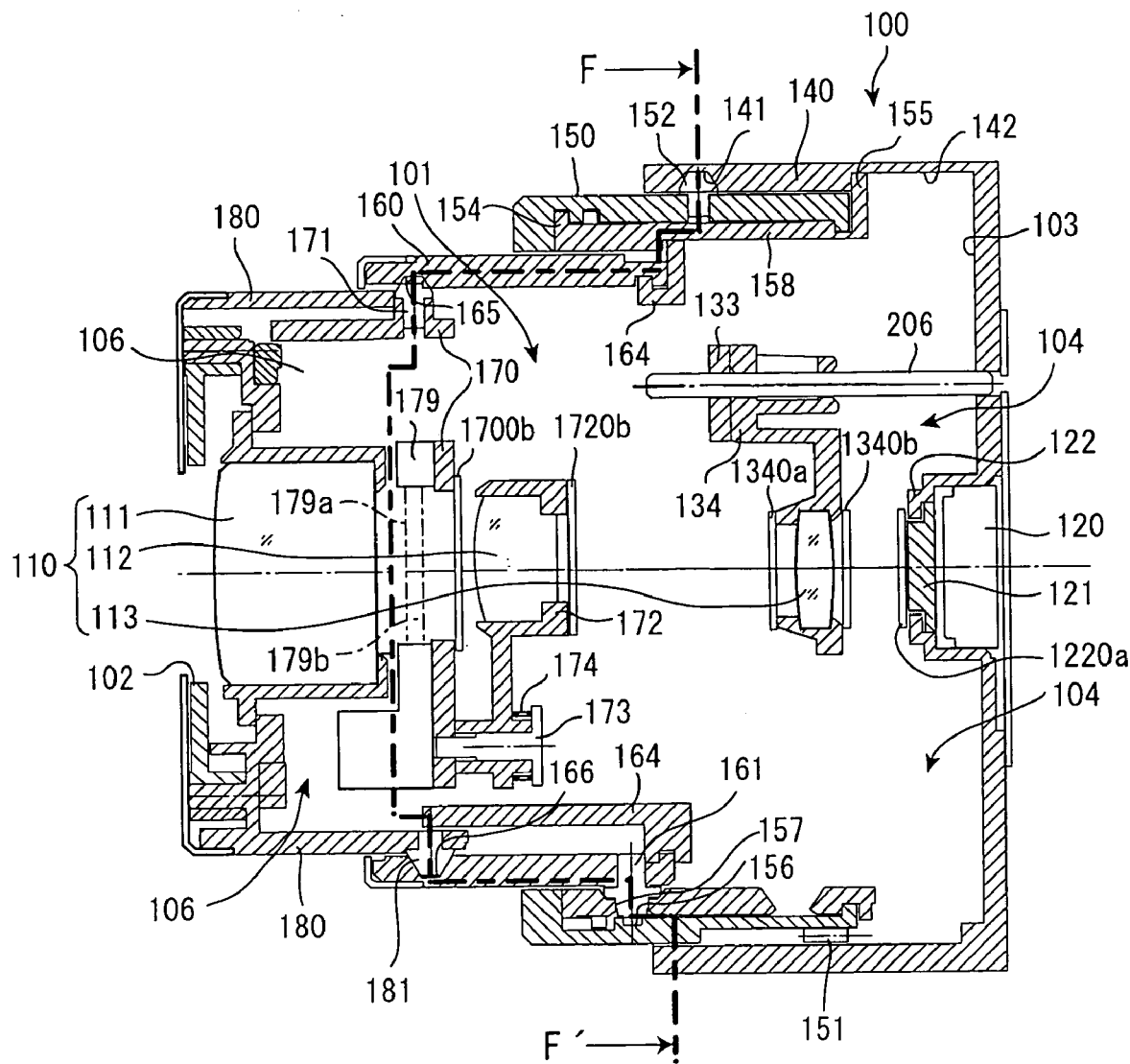

FIG. 10 is a cross-sectional view similar to FIG. 9 with the cutting-plane lines B–B' and C–C' additionally shown;

FIG. 11 is a cross-sectional view taken along the cutting-plane line C–C' in FIG. 10;

FIG. 12 is a cross-sectional view taken along the cutting-plane line B–B' in FIG. 10;

FIG. 13 schematically shows a protrusion on a wall member and an engaging part of a focusing lens holding member viewed from a direction orthogonal to the viewing direction of FIG. 8;

FIG. 14 is a block diagram showing a circuit arrangement of the digital camera shown in FIGS. 1 to 12;

FIG. 15 is a cross-sectional view of the digital camera according to a second embodiment in the telephoto-end state with the maximum focal length, which is taken along the optical axis;

FIG. 16 is a cross-sectional view of the digital camera according to the second embodiment shown in FIG. 15 in the collapsed state, which is taken along the optical axis;

FIG. 17 is a schematic view of essential components of the lens barrel, in the extended state, of the digital camera according to a third embodiment, which are viewed along the optical axis;

FIG. 18 is a cross-sectional view similar to FIG. 17 with the cutting-plane lines A–A', D–D' and G–G' additionally shown;

FIG. 19 is a cross-sectional view showing the telephoto-end state with the maximum focal length, which is taken along the cutting-plane line A–A' shown in FIG. 18;

FIG. 20 is a cross-sectional view taken along the same cutting-plane line as in FIG. 19;

FIG. 21 is a cross sectional-view taken along the cutting-plane line G–G' in FIG. 18;

FIG. 22 is a cross-sectional view taken along the cutting-plane line D–D' in FIG. 18;

FIG. 23 is a schematic view of essential components of the lens barrel, in the collapsed state, of the digital camera according to the third embodiment, which are viewed along the optical axis;

FIG. 24 is a cross-sectional view taken by cutting the arrangement shown in FIG. 23 along a line corresponding to the cutting-plane line C–C' in FIG. 10 which shows the first embodiment and corresponds to FIG. 23;

FIG. 25 is a cross-sectional view taken by cutting the arrangement shown in FIG. 23 along a line corresponding to the cutting-plane line B–B' in FIG. 10 which shows the first embodiment and corresponds to FIG. 23;

FIG. 26 is a cross-sectional view of essential components of the lens barrel, in the extended state, of the digital camera according to the fourth embodiment;

FIG. 27 is a diagram showing a non-contact type of cleaning member; and

Figure 28:
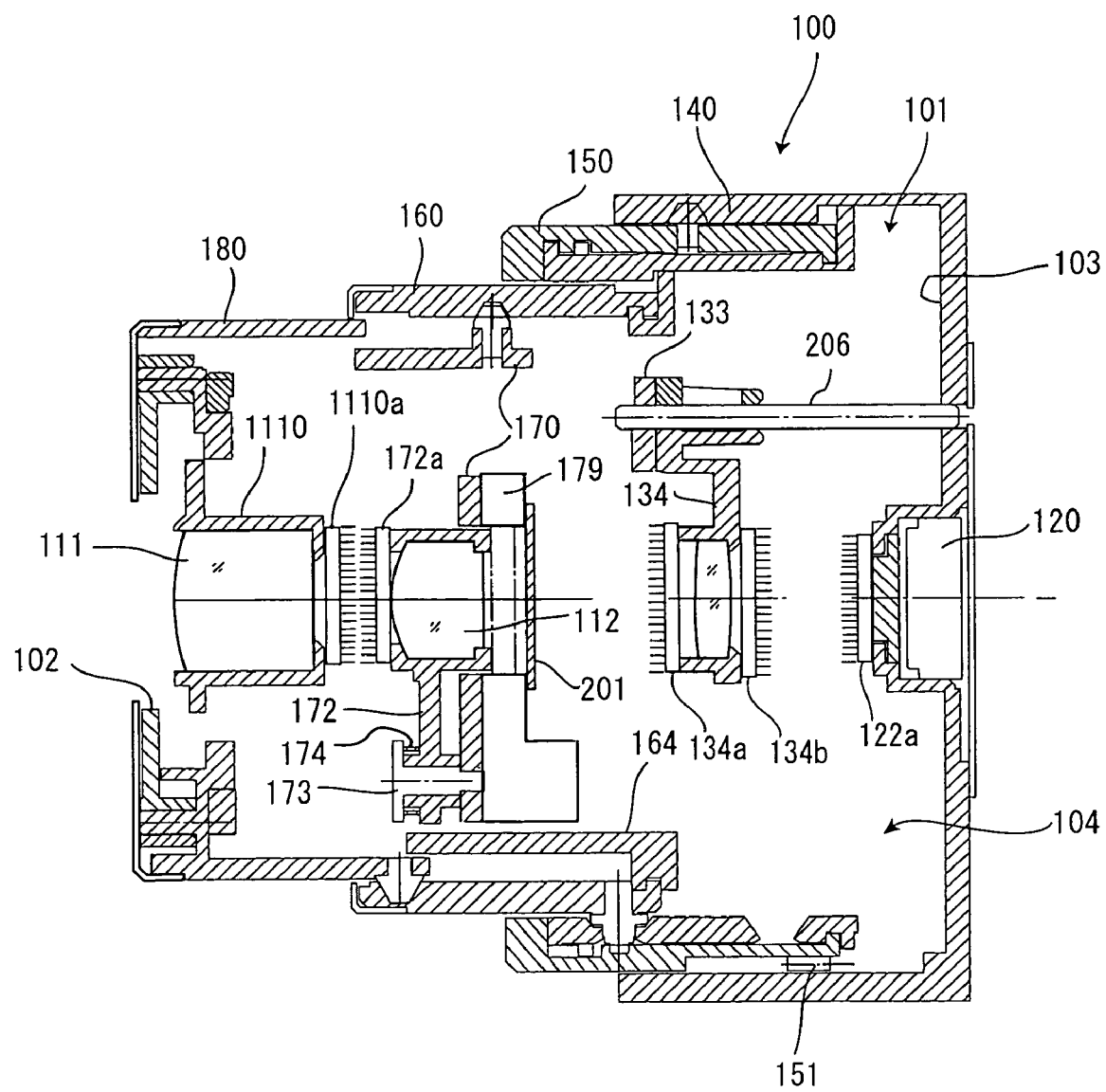

FIG. 28 is a diagram showing an example in which extraneous matter adhering to a cleaning member is removed in a non-contact manner.

DETAILED DESCRIPTION OF THE PREFERRED EMBODIMENTS

Now, embodiments of the present invention will be described.

Figure 1:
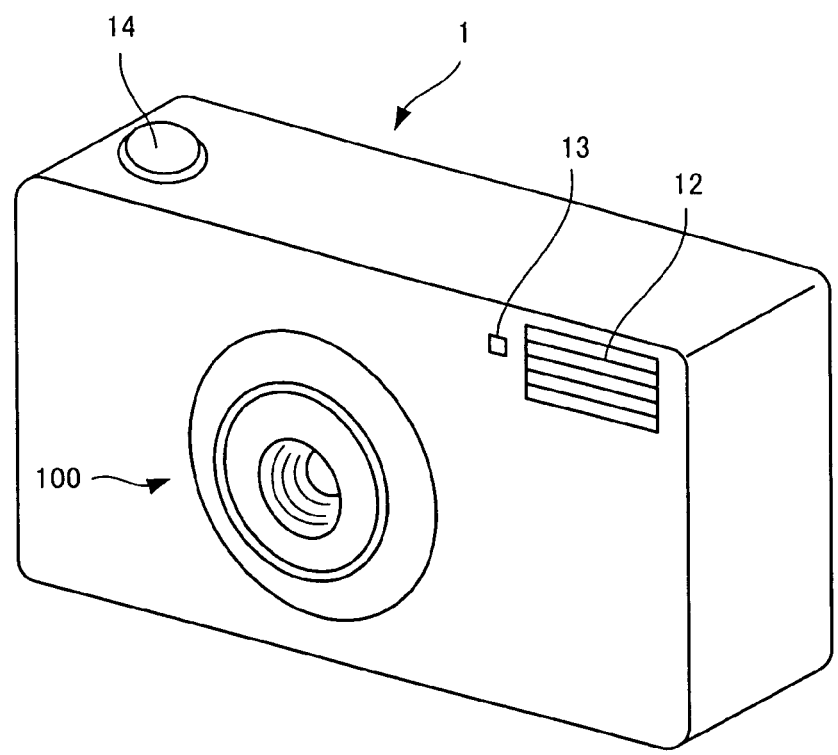
FIG. 1 is a perspective view of a digital camera according to a first embodiment of the present invention.
Figure 2:
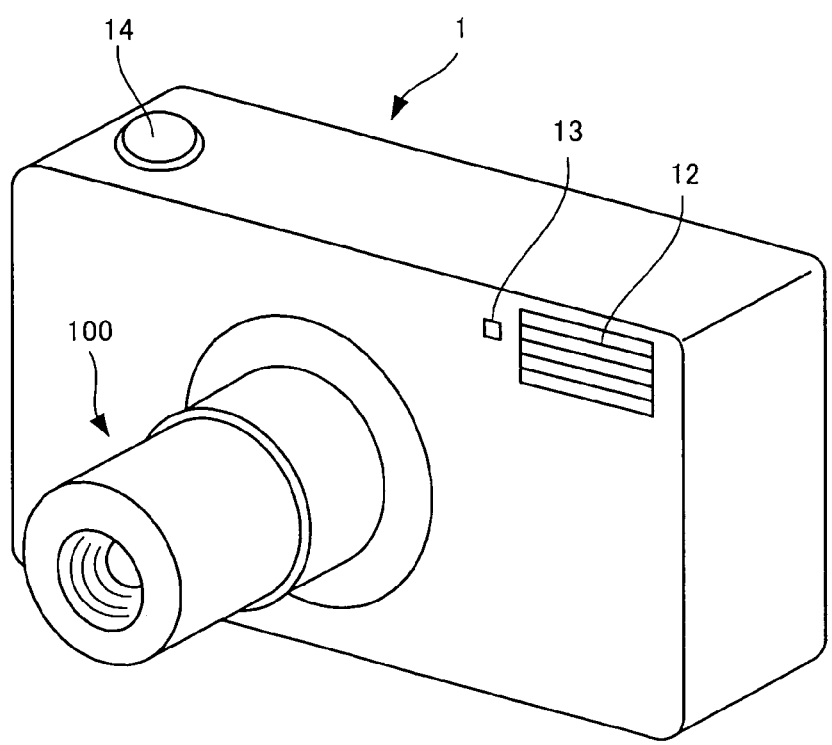
FIG. 2 is a perspective view of the digital camera according to the first embodiment of the present invention.

FIGS. 1 and 2 are perspective views of a digital camera according to a first embodiment of the present invention.

FIG. 1 shows a digital camera 1 according to this embodiment with a lens barrel 100 incorporating a zoom lens being collapsed. FIG. 2 shows the digital camera 1 with the lens barrel 100 being extended.

The lens barrel 100 of the digital camera 1 shown in FIGS. 1 and 2 incorporates a taking lens composed of three lens groups as described later. The focal length is adjusted by displacing the lens groups along the optical axis, and the focus is adjusted by displacing a third lens group, which serves as a focusing lens, along the optical axis.

The digital camera 1 shown in FIGS. 1 and 2 has an auxiliary light emission window 12 and a finder objective window 13 in an upper area of the front face thereof. In addition, the digital camera 1 has a shutter button 14 on the top face thereof.

The digital camera 1 has zoom manipulation switches on the rear face thereof (not shown). If one of the zoom manipulation switches is pressed, the lens barrel 100 continues to extend toward the telephoto position as far as the switch is pressed, and if the other zoom manipulation switch is pressed, the lens barrel 100 continues to move toward the wide angle position as far as the switch is pressed.

Figure 3:
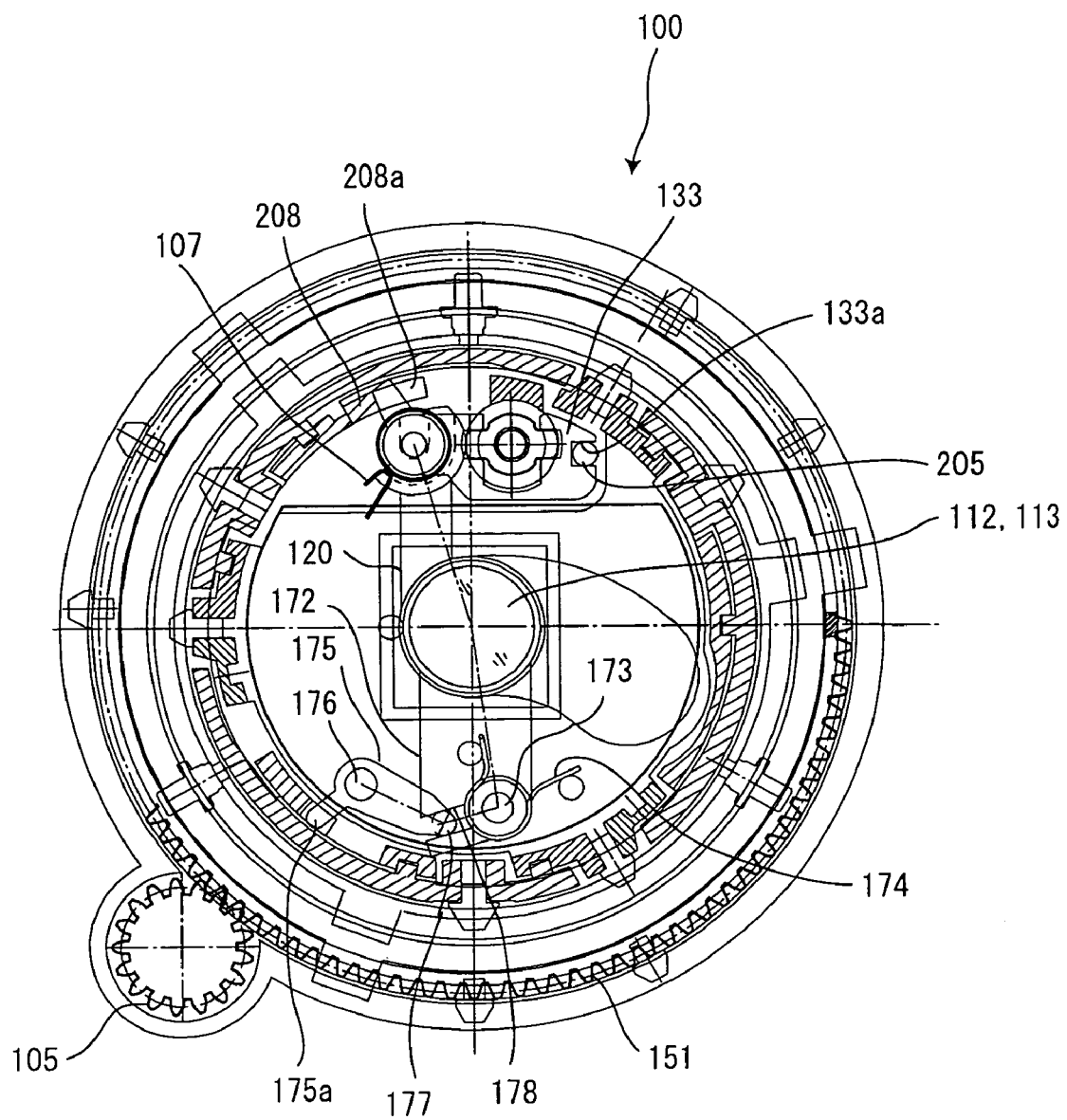
FIG. 3 is a schematic view of essential components of a lens barrel, in an extended state, of the digital camera according to the first embodiment, which are viewed along the optical axis.
Figure 4:
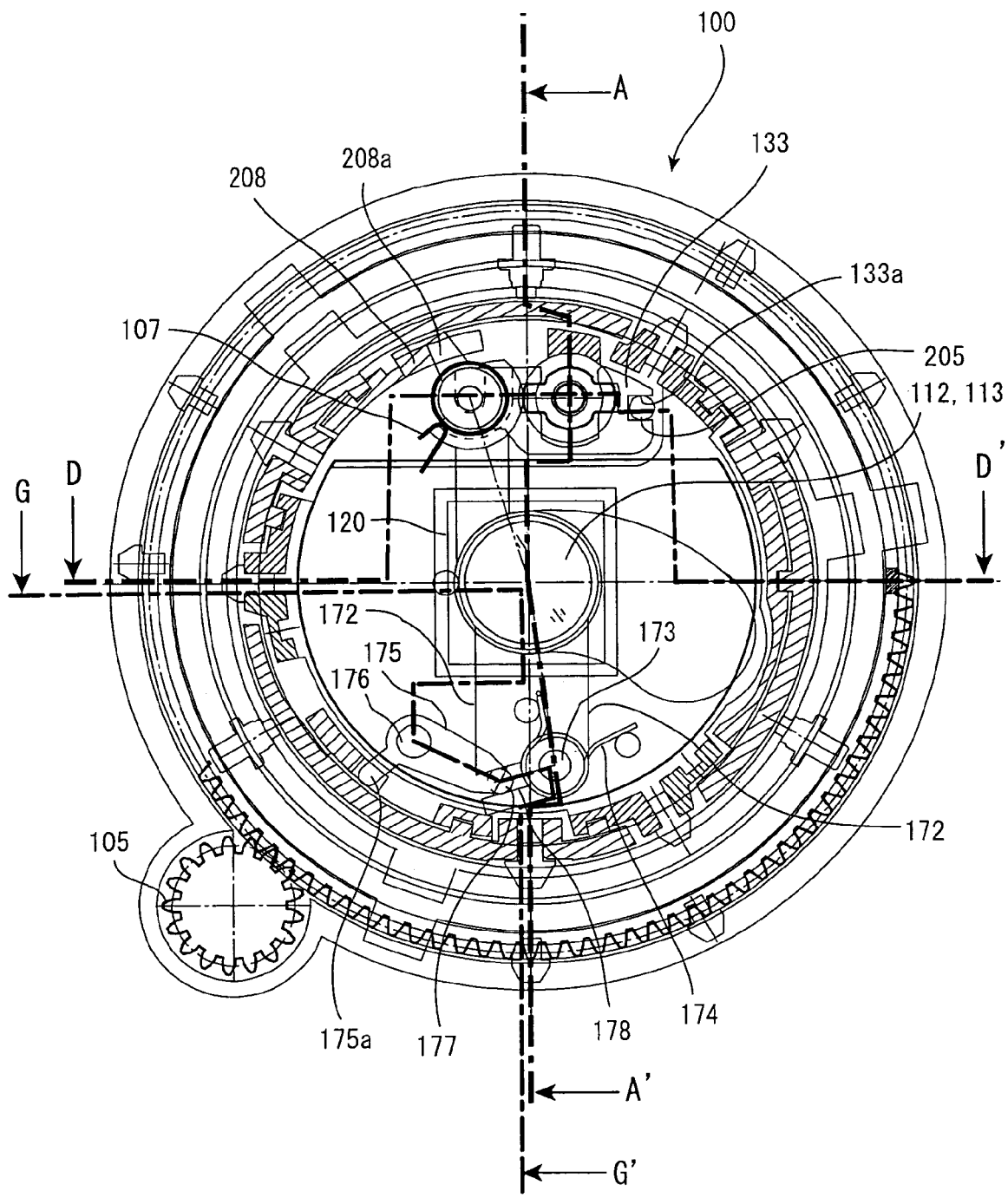
FIG. 4 is a cross-sectional view similar to FIG. 3 with the cutting-plane line A–A', the cutting-plane D–D', and the cutting-plane line G–G' additionally shown.
Figure 5:
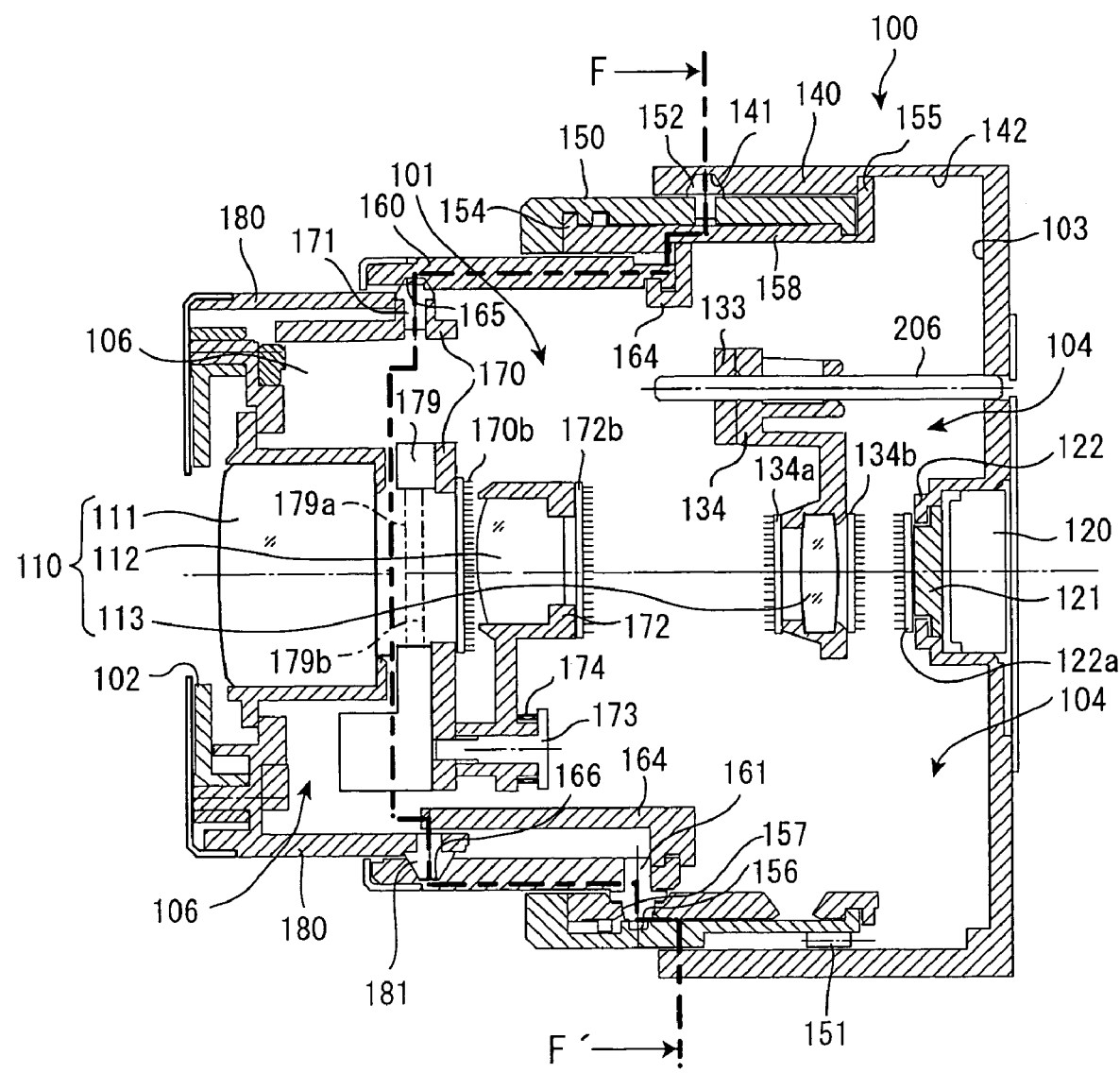
FIG. 5 is a cross-sectional view for illustrating a telephoto-end state with the maximum focal length, which is taken along the cutting-plane line A–A' in FIG. 4.
Figure 6:
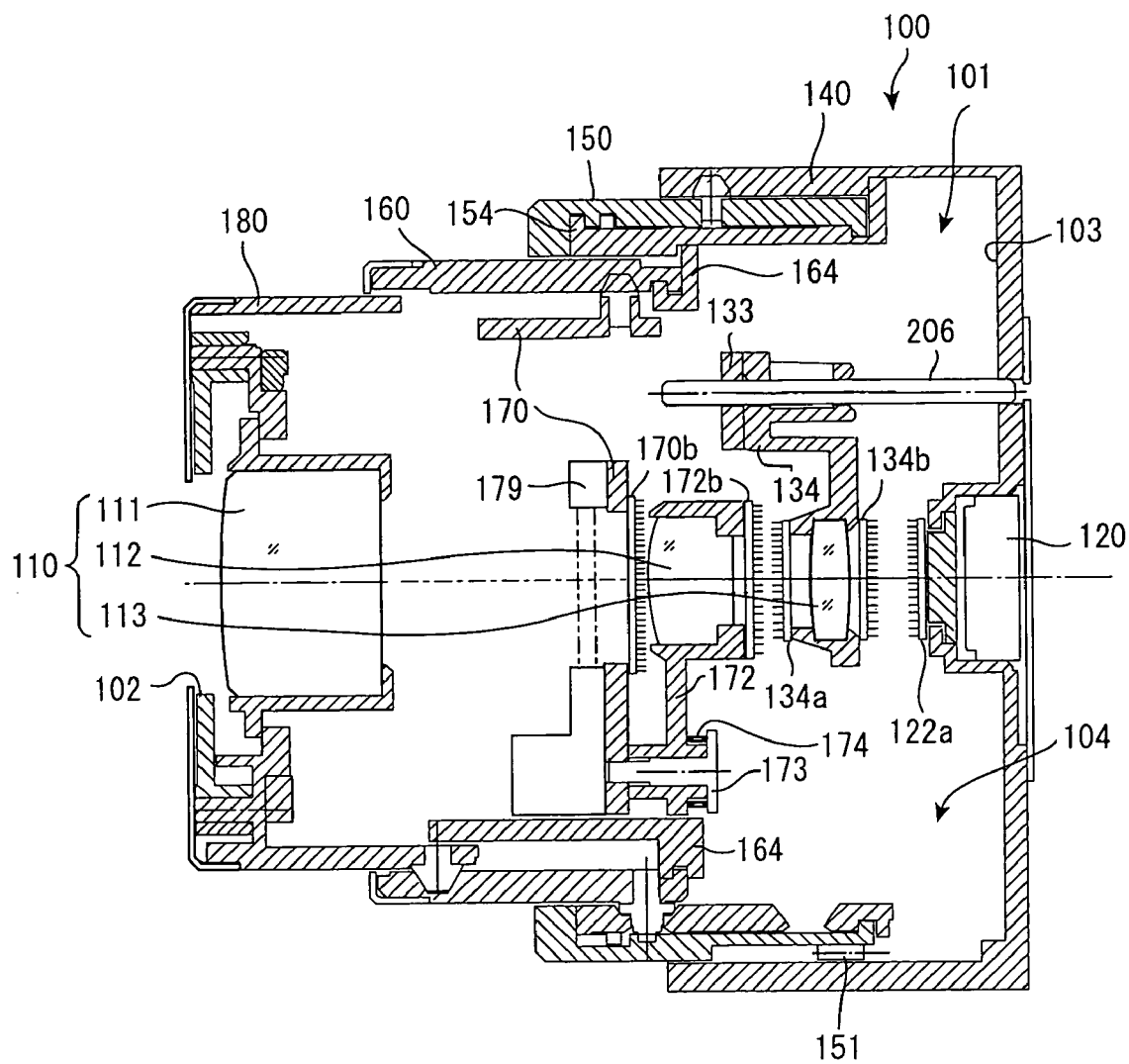
FIG. 6 is a cross-sectional view for illustrating a wide-angle-end state with the minimum focal length, which is taken along the cutting-plane line A–A' in FIG. 4.
Figure 7:
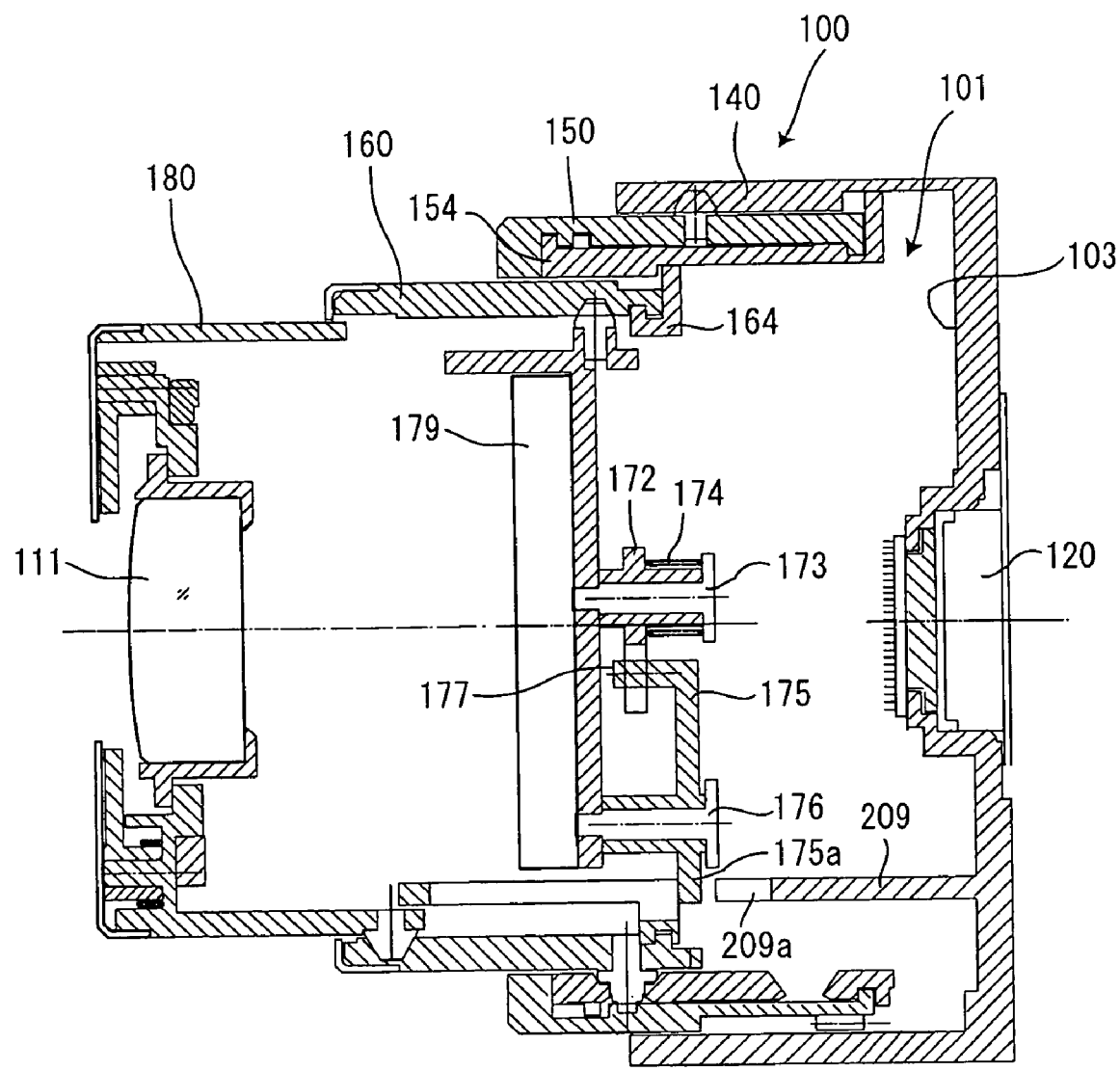
FIG. 7 is a cross-sectional view taken along the cutting-plane line G–G' in FIG. 4.

FIG. 3 is a schematic view of essential components of the lens barrel, in the extended state, of the digital camera 1 shown in FIGS. 1 and 2, which are viewed along the optical axis. FIG. 3 is a cross-sectional view taken along the cutting-plane line F–F' in FIG. 5 described later. FIG. 4 is a cross-sectional view similar to FIG. 3 with the cutting-plane lines A–A', D–D' and G–G' additionally shown. FIG. 5 is a cross-sectional view for illustrating a telephoto-end state with the maximum focal length taken along the cutting-plane line A–A' in FIG. 4. FIG. 6 is a cross-sectional view for illustrating a wide-angle-end state with the minimum focal length taken along the cutting-plane line A–A' in FIG. 4. FIG. 7 is a cross-sectional view taken along the cutting-plane line G–G' in FIG. 4. FIG. 8 is a cross-sectional view taken along the cutting-plane line D–D' in FIG. 4. FIG. 9 is a schematic view of essential components of the lens barrel, in the collapsed state, of the digital camera according to the first embodiment shown in FIGS. 1 to 8, which are viewed along the optical axis. FIG. 9 is a cross-sectional view taken along the cutting-plane line E–E' in FIG. 11 described later. FIG. 10 is a cross-sectional view similar to FIG. 9 with the cutting-plane lines B–B' and C–C' additionally shown. FIG. 11 is a cross-sectional view taken along the cutting-plane line C–C' in FIG. 10. FIG. 12 is a cross-sectional view taken along the cutting-plane line B–B' in FIG. 10.

The following description will be made primarily referring to FIGS. 5 and 9 and additionally referring to the other drawings as required.

An inner space 101 of the lens barrel 100 of the digital camera 1 houses a three-group taking lens 110 consisting of a front lens group 111, a rear lens group 112 and a focusing lens 113 arranged in this order from the front to the rear along the optical axis. The focal length of the taking lens 110 varies as the rear lens group 112 is displaced between the telephoto end shown in FIG. 5 and the wide-angle end shown in FIG. 6, and the focus is adjusted by the focusing lens 113 being displaced along the optical axis.

At the front end of the inner space 101, an opening 102 for providing a field of view for the taking lens 110 is formed, and at the rear end thereof, there is a wall member 103 that is fixed to the camera body or forms a part of the camera body. The inner space 101 is defined by the wall member 103 and plural housings described later.

The front lens group 111 is held in a front group frame 180, which is one of the plural housings which has a minimum outer diameter and is located at the forefront along the optical axis when the lens barrel is extended. The front lens group 111 has an outer diameter smaller than the inner diameter of the front group frame 180, and thus, a space is formed between the front lens group 111 and the front group frame 180. In the following description, the space between the front lens group 111 and the front group frame 180 is referred to as a front lens group side space 106.

The wall member 103 has a CCD guiding frame 122 protruding into the inner space 101 attached thereto, and the CCD guiding frame incorporates a CCD solid-state image pickup element (abbreviated as a CCD, hereinafter) 120 and a low pass filter (abbreviated as an LPF, hereinafter) located toward the front from the CCD 120 along the optical axis. Since the CCD guiding frame 122 is provided protruding into the inner space 101, a recess section 104, which is a space defined by the guiding frame 122 and the wall member 103, is formed at the side of the CCD guiding frame 122. As shown in FIG. 5, a brush 122a for cleaning the back face of the focusing lens 113 is provided on the front side of the CCD guiding frame 122 along the optical axis. In FIG. 9, the brush 122a is shown as being provided along the left edge of the CCD guiding frame 122. The CCD guiding frame 122 and the LPF 121 are flush on the front with each other.

In addition, the wall member 103 has a feed screw 131 (see FIG. 8) rotatably supported thereon, a nut member 132 is engaged with the feed screw 131, and a focusing lens guiding frame 133, which guides the focusing lens 113 along the optical axis, is fixed to the nut member 132. The focusing lens guiding frame 133 is fixed to the nut member 132, and a guide rod 205 protruding from the wall member 103 is fitted into a forked groove 133a (see FIG. 3) formed in the focusing lens guiding frame 133. Thus, the focusing lens guiding frame 133 moves along the optical axis when the feed screw 131 rotates.

In addition, the focusing lens guiding frame 133 has a focusing lens holding frame 134 for holding the focusing lens, and the focusing lens holding frame 134 is pivotally supported on a rotation shaft 206 and is biased by a coil spring 107 (see FIG. 8) in such a direction that the focusing lens 113 is on the optical axis of the taking lens 110. The focusing lens holding frame 134 pivots within a range from a position where the focusing lens 113 held by the focusing lens holding frame 134 is advanced onto the optical axis of the taking lens 110 (see FIGS. 5 and 6) to a retracted position where the focusing lens 113 is retracted into the recess section 104 at the side of the CCD guiding frame 122 (see FIG. 11).

A mechanism of how rotation of the focusing lens holding frame 134 causes the focusing lens 113 to be retracted into the retracted position provided in the recess section 104 will be described later. As shown in FIGS. 5 and 9, the focusing lens holding frame 134 has a brush 134a for wiping the back face of the rear lens group 112 on the front side thereof along the optical axis and a brush 134b for wiping the front face of the LPF 121 on the back side thereof. In FIG. 9, the brush 134a is shown as being provided along the right half of the circumference of the focusing lens 113. The brush 134b is provided in the corresponding area of the backside thereof.

The feed screw 131 engaged with the nut member 132 having the focusing lens guiding frame 133 fixed thereto is rotationally driven by a focus motor (not shown) provided in the camera body. The rotation of the feed screw 131 causes the focusing lens guiding frame 133 fixed to the nut member 132 and the focusing lens holding frame 134 pivotally supported on the focusing lens guiding frame 133 to move along the optical axis, and thus, the focusing lens 113 held by the focusing lens holding frame 134 moves along the optical axis. In this way, the position of the focusing lens 113 is adjusted so that a focused object image is formed on the front surface of the CCD 120.

The wall member 103 has a fixed sleeve 140 secured thereto, and a rotatable sleeve 150 is provided in the fixed sleeve 140. The rotatable sleeve 150 has a geared section 151 engaged with a pillar-shaped gear 105 (see FIG. 3) on its outer surface. The pillar-shaped gear 105 is rotationally driven by a lens barrel drive motor (not shown) to cause the rotatable sleeve 150 to rotate. In addition, the fixed sleeve 140 has a cam groove 141 formed in the inner wall thereof, and a cam pin 152 fixed to the rotatable sleeve 150 is fitted into the cam groove 141. Thus, when a rotational driving force is applied to the rotatable sleeve 150 via the pillar-shaped gear 105, the rotatable sleeve 150 moves forward or rearward along the optical axis while rotating.

In the rotatable sleeve 150, a rotatable-sleeve-side rectilinearly-moving key ring 154 is provided in such a manner that it can rotate with respect to the rotatable sleeve 150 but cannot relatively move with respect to the rotatable sleeve 150 along the optical axis. In addition, a key plate 155 is fixed to the rotatable-sleeve-side rectilinearly-moving key ring 154, and the key plate 155 is fitted into a key groove 142 formed in the inner wall of the fixed sleeve 140 and extending along the optical axis. Thus, the rotatable-sleeve-side rectilinearly-moving key ring 154 can move along the optical axis but is prevented from rotating with respect to the fixed sleeve 140. Therefore, when the rotatable sleeve 150 moves along the optical axis while rotating, the rotatable-sleeve-side rectilinearly-moving key ring 154 moves with the rotatable sleeve 150 along the optical axis without rotating because it is prevented from rotating with respect to the fixed sleeve 140.

In addition, a rotatable intermediate sleeve 160 is provided in the rotatable sleeve 150. The rotatable sleeve 150 has a cam groove 156 formed in the inner wall thereof, and the rotatable-sleeve-side rectilinearly-moving key ring 154 has a cam groove 157 penetrating from the outer surface to the inner surface thereof. A cam pin 161 on the intermediate sleeve 160 is fitted into the cam groove 156 in the rotatable sleeve 150 through the cam groove 157 in the rotatable-sleeve-side rectilinearly-moving key ring 154. Thus, if the rotatable sleeve 150 moves along the optical axis while rotating, the intermediate sleeve 160 also moves along the optical axis with respect to the rotatable sleeve 150 while rotating in accordance with the shapes of the cam grooves in the rotatable sleeve 150 and rotatable-sleeve-side rectilinearly-moving key ring 154.

An intermediate-sleeve-side rectilinearly-moving key ring 164 is provided in the intermediate sleeve 160. The rotatable-sleeve-side rectilinearly-moving key ring 154 described above has a rectilinear key groove 158, and the intermediate-sleeve-side rectilinearly-moving key ring 164 is fitted into the rectilinear key groove 158 in the rotatable-sleeve-side rectilinearly-moving key ring 154. The intermediate-sleeve-side rectilinearly-moving key ring 164 can rotate relatively with respect to the intermediate sleeve 160 but is prevented from moving along the optical axis with respect to the intermediate sleeve 160. Thus, if the intermediate sleeve 160 moves along the optical axis with respect to the rotatable sleeve 150 while rotating, the intermediate-sleeve-side rectilinearly-moving key ring 164 moves rectilinearly, without rotating, along the optical axis with the intermediate sleeve 160 moving along the optical axis.

A cam groove 165 for guiding a rear group guiding frame 170 is provided in the inner wall of the intermediate sleeve 160. A cam pin 171 fixed to the rear group guiding frame 170 is fitted into the cam groove 165 in a state where the cam pin is prevented from rotating with respect to the intermediate-sleeve-side rectilinearly-moving key ring 164. Thus, when the intermediate sleeve 160 rotates, the rear group guiding frame 170 moves rectilinearly along the optical axis in accordance with the shape of the cam groove 165 in the inner wall of the intermediate sleeve 160.

Viewed along the optical axis, a PLZT shutter unit 179 is fixed to the front of the rear group guiding frame 170. The shutter unit 179 has both a diaphragm member 179a that controls the quantity of object light passing through the taking lens 110 and a shutter member 179b that controls the quantity of object light passing through the taking lens 110 by controlling the shutter speed. In addition, a rear group holding frame 172 for holding the rear lens group 112 is pivotally supported on the rear of the rear group guiding frame 170 by a rotation shaft 173 in such a manner that it can rotate with respect to the rear group guiding frame 170. The rear group holding frame 172 rotates within a range between an in-use position where the rear lens group 112 held by the rear group holding frame 172 is advanced onto the optical axis of the taking lens 110 (see FIGS. 5 and 6) and a retracted position where the rear lens group 112 is retracted in the recess section 104 at the side of the CCD 120 (see FIG. 11). In addition, a coil spring 174 is provided surrounding the rotation shaft 173, and the rear group holding frame 172 is biased by the coil spring 174 in the direction of the optical axis of the taking lens 110 and the direction in which the rear lens group 112 turns onto the optical axis.

A mechanism of how rotation of the rear group holding frame 172 causes the rear lens group 112 to rotate into the retracted position in the recess section 104 will be described later. The rear group holding frame 172 has a brush 172b for wiping the front face of the focusing lens 113 on the back side thereof, and the rear group guiding frame 170 has a brush 170b for wiping the front face of the rear lens group 112 on the back side thereof. In FIG. 9, although it cannot actually be viewed, the brush 172b is shown as being provided on the backside of the rear lens group 112 along the left half of the circumference thereof. The brush 170b provided on the rear group guiding frame 170 is not shown in FIG. 9 for simplicity of illustration.

The intermediate sleeve 160 has another cam groove 166 for guiding the front group frame 180 holding the front lens group 111, and a cam pin 181 on the front group frame 180 is fitted into the cam groove 166. The front group frame 180 is attached to the intermediate-sleeve-side rectilinearly-moving key ring 164 in such a manner that the front group frame can move along the optical axis but is prevented from rotating. Thus, when the intermediate sleeve 160 rotates, the front group frame 180 moves rectilinearly with respect to the intermediate sleeve 160 along the optical axis in accordance with the shape of the cam groove 166.

With such a mechanism, if a rotational driving force to collapse the lens barrel is transmitted to the rotatable sleeve 150 via the pillar-shaped gear 105 when the lens barrel is in the telephoto-end state shown in FIG. 5, the lens barrel is collapsed from the telephoto-end state in FIG. 5 to a state shown in FIGS. 11 and 12 via the wide-angle-end state shown in FIG. 6. On the other hand, if a rotational driving force to extend the lens barrel is transmitted to the rotatable sleeve 150 when the lens barrel is in the collapsed state shown in FIGS. 11 and 12, the lens barrel is extended from the collapsed state in FIGS. 11 and 12 to the wide-angle-end state shown in FIG. 6 and then to the telephoto-end state shown in FIG. 5.

When taking a picture, the zoom manipulation switches described earlier are manipulated to adjust the focal length between the telephoto end shown in FIG. 5 and the wide-angle end shown in FIG. 6, thereby setting a desired angle of view. The focusing lens 113 is adjusted to focus on a point where the maximum contrast is achieved, based on contrast detection using image signals provided by the CCD 120. Then, in response to the shutter button being pressed, the CCD 120 generates image signals representing the object at that time, and the signals are recorded after an appropriate image processing.

Now, a mechanism for turning the rear lens group 112 into the retracted position in the recess section 104 when the lens barrel is collapsed will be described.

As described above, the rear group holding frame 172 for holding the rear lens group 112 is rotatably pivotally supported on the rear group guiding frame 170 by the rotation shaft 173 and biased by the coil spring 174 (see FIG. 3) in such a direction that the rear lens group 112 is on the optical axis of the taking lens 110. The rear group guiding frame 170 has a lever member 175 shown in FIGS. 3, 7 and the like rotatably pivotally supported thereon by a rotation shaft 176. The rear group holding frame 172 has a fork-shaped engaging groove 178 as shown in FIG. 3, and an engaging pin 177 formed on one end of the lever member 175 is fitted into the engaging groove 178.

As shown in FIG. 7, the wall member 103 constituting the rear surface of the inner space 101 of the lens barrel 100 has a protrusion 209 which protrudes into the inner space 101 and is located in the trajectory drawn by an end 175a of the lever member 175 when the lens barrel is collapsed, the end 175a being located opposite to the end having the engaging pin 177. The protrusion 209 has a tapered surface 209a toward the tip thereof. Thus, when the rotatable sleeve 150 rotates in a lens-barrel-collapsing direction, the intermediate sleeve 160 and the rear group guiding frame 170 cam-engaged with the intermediate sleeve 160 also move in the lens-barrel-collapsing direction, the end 175a of the lever member 175 comes into contact with the tapered surface 209a of the protrusion 209 and moves along the tapered surface 209a, and thus, the lever member 175 rotates from a rotational position shown in FIG. 3 to a rotation position shown in FIG. 9. Then, because the engaging pin 177 of the lever member 175 (see FIG. 3) is fitted into the fork-shaped engaging groove 178 in the rear group holding frame 172, the rear group holding frame 172 also rotates about the rotation shaft 173, causing the rear lens group 112 to rotate from a position on the optical axis shown in FIG. 3 to the retracted position shifted from the optical axis shown in FIG. 9. As shown in FIG. 11, the retracted position is constituted by the recess section 104 formed at the side of the CCD 120.

When the lens barrel is extended from the collapsed state shown in FIGS. 11 and 12, the protrusion 209 extending from the wall member 103 shown in FIG. 7 is disengaged from the lever member 175, and the rear group holding frame 172 is rotated from the state shown in FIG. 9 to the state shown in FIG. 3 by the biasing force of the coil spring 174. Thus, the rear lens group 112 rotates from the retracted position shown in FIG. 11 or the like to a position on the optical axis.

Now, a mechanism for turning the focusing lens 113 into the focusing-lens-retracted position when the lens barrel is collapsed will be described.

As described above, the focusing lens holding frame 134 holding the focusing lens 113 is rotatably pivotally supported on the focusing lens guiding frame 133 by the rotation shaft 206 and biased by the coil spring 107 (see FIG.

3) in such a direction that the focusing lens 113 is on the optical axis of the taking lens 110.

As shown in FIG. 8, the wall member 103 constituting the rear surface of the inner space 101 of the lens barrel 100 has a protrusion 208 which protrudes into the inner space 101 and is located in a trajectory drawn by an engaging part 1341 of the focusing lens holding member 134 when the lens barrel is collapsed.

FIG. 13 schematically shows the protrusion on the wall member and the engaging part of the focusing lens holding member viewed from a direction orthogonal to the viewing direction of FIG. 8.

As shown in FIG. 13, the protrusion 208 on the wall member 103 has a tapered surface 208a which engages with the engaging part 1341 of the focusing lens holding member. Therefore, when the feed screw 131 rotates to bring the focusing lens 113 close to the CCD 120, the engaging part 1341 of the focusing lens holding member 134 comes into contact with the tapered surface 208a of the protrusion 208 and moves along the tapered surface 208a. Thus, the focusing lens holding member 134 rotates about the rotation shaft 206, and the focusing lens 113 held by the focusing lens holding member 134 rotates out of a position on the optical axis into a retracted position in the recess section 104 at the side of the CCD 120 (see FIG. 11).

When the lens barrel is extended from the collapsed state shown in FIGS. 11 and 12, the protrusion 208 protruding from the wall member 103 is disengaged from the focusing lens holding member 134, and the focusing lens holding member 134 is rotated from the state shown in FIG. 9 to the state shown in FIG. 3 by the biasing force of the coil spring 107. Thus, the focusing lens 113 rotates from the retracted position in the recess section at the side of the CCD 120 shown in FIG. 11 to a position on the optical axis.

In this digital camera 1, as described above, when the lens barrel is collapsed, the focusing lens 113 and the rear lens group 112 are retracted in the recess section at the side of the CCD 120. The recess section 104 tends to be a dead space in a digital camera with a conventional collapsing and extending mechanism which includes no mechanism for retracting the taking lens from the optical axis so that the taking lens remains on the optical axis when the lens barrel is collapsed. However, according to this embodiment, since both the focusing lens 113 and the rear lens group 112 are displaced from the optical axis and retracted into the recess section 104, the recess section 104 can be effectively used, and thus, the digital camera can be thinner than conventional.

In addition, as shown in FIGS. 5 and 9, in the digital camera 1, when the rear lens group 112 and the focusing lens 113 are retracted from the optical axis or advanced onto the optical axis, the front face of the rear lens group 112 is wiped by the brush 170b on the back side of the rear group guiding frame 170, the back face of the rear lens group 112 is wiped by the brush 134a provided on the front side of the focusing lens holding frame 134 along the right half of the circumference of the focusing lens 113, and the front face of the focusing lens 113 is wiped by the brush 172b provided on the back side of the rear group holding frame 172 along the left half of the circumference of the rear lens group 112. In addition, the brush 122a provided on the front side of the CCD guiding frame 122 along the left edge thereof wipes the back face of the focusing lens 113, and the brush 134b provided on the back side of the focusing lens holding frame 134 along the right half of the circumference of the focusing lens 113 wipes the front face of the LPF.

Therefore, the digital camera 1 can be made thinner than conventional in the collapsed state and is improved in suppression of degradation of image quality due to dust or the like in the lens barrel.

FIG. 14 is a block diagram showing a circuit arrangement of the digital camera shown in FIGS. 1 to 12.

The digital camera 1 has the taking lens 110, the shutter unit 179 and the CCD 120 described above. An object image formed on the CCD 120 via the taking lens 110 and the shutter unit 179 is converted into an analog image signal by the CCD 120. The shutter unit 179 serves to suppress occurrence of a smear due to light when reading the analog signal from the CCD 120.

In addition, the digital camera 1 has an auxiliary light emitting section 130, which emits auxiliary light when the illuminance is inadequate. The auxiliary light emitting section 130 can emit light as required, even if the illuminance is adequate.

The digital camera 1 further has an analog signal processing section 501, an A/D converter section 502, a digital signal processing section 503, a temporary memory 504, a compression/expansion section 505, a built-in memory (or a memory card) 506, an image monitor 507 and driver circuitry 508. The CCD image pickup device 120 is driven at the timing generated by a timing generator circuit (not shown) in the driver circuitry 508 and outputs an analog image signal. In addition, the driver circuitry 508 has driver circuits for driving the taking lens 110, the shutter unit 179, the auxiliary light emitting section 130 or the like. The analog image signal output from the CCD image pickup device 120 is subjected to an analog signal processing in the analog signal processing section 501, A/D-converted in the A/D converter section 502 and then subjected to a digital signal processing in the digital signal processing section 503. The data representing the digital-processed signal is temporarily stored in the temporary memory 504. The data stored in the temporary memory 504 is compressed in the compression/expansion section 505, and the compressed data is recorded in the built-in memory (or memory card) 506. Depending on the picture-taking mode, the compression step may be omitted and the data may be directly recorded in the built-in memory 506. The data stored in the temporary memory 504 is read out and transferred to the image monitor 507. In this way, the object image is displayed on the image monitor 507.

Furthermore, the digital camera 1 has a CPU 509 for controlling the whole of the digital camera 1, a group of switches 510 including the zoom manipulation switches, and the shutter button 14. Picture taking is achieved by pressing the shutter button 14 after setting desired picture-taking conditions including a desired angle of view through manipulation of the group of switches 510.

Now, a digital camera according to a second embodiment of the present invention will be described.

The appearance and general circuit arrangement of the digital camera according to the embodiment described below is substantially the same as the appearance (see FIGS. 1 and 2) and general circuit arrangement (see FIG. 14) of the digital camera according to the first embodiment described above, and any difference in appearance or circuit arrangement doesn't obstruct explanation of the characteristics of the present invention. Therefore, illustration and description thereof will be omitted, and only the arrangement of the lens barrel will be described. In addition, in the description of the lens barrel, components serving the same as those in the first embodiment are assigned the same reference numerals as those shown in the drawings concerning the first embodiment, and only differences therebetween will be described.

FIG. 15 is a cross-sectional view of the digital camera according to this embodiment in the telephoto-end state with the maximum focal length, which is taken along the optical axis. FIG. 16 is a cross-sectional view of the digital camera according to this embodiment shown in FIG. 15 in the collapsed state, which is taken along the optical axis.

FIGS. 15 and 16 correspond to FIGS. 5 and 11 concerning the first embodiment, respectively. The second embodiment differs from the first embodiment only in that the shutter unit 179, which is fixed to the rear group guiding frame 170 in the first embodiment, is fixed to the rear group holding frame 172 in the second embodiment.

Since the shutter unit 179 is fixed to the rear group holding frame 172 holding the rear lens group 112, the shutter unit 179 is retracted in the recess section 104 at the side of the CCD 120 along with the rear lens group 112 as shown in FIG. 16 when the lens barrel is collapsed, and is advanced onto the optical axis along with the rear lens group 112 as shown in FIG. 15 when the lens barrel is extended.

In the first embodiment described earlier, as shown in FIG. 5, the brush 170b on the backside of the rear group guiding frame 170 wipes the front face of the rear lens group 112. However, in this embodiment, the brush 170b wipes the front face of the diaphragm 179a of the shutter unit 179.

The mechanism of the retraction and advancement involved with the collapse and extension of the lens barrel is the same as that in the first embodiment described above, and redundancy of illustration and description thereof is avoided herein.

Thus, the digital camera according to this embodiment can be made thinner than conventional in the collapsed state and is improved in suppression of degradation of image quality due to dust or the like in the lens barrel.

Now, a digital camera according to a third embodiment of the present invention will be described.

FIG. 17 is a schematic view of essential components of a lens barrel, in the extended state, of the digital camera according to this embodiment, which are viewed along the optical axis. FIG. 17 is a cross-sectional view taken by cutting the arrangement shown in FIG. 19 described later along a line corresponding to the cutting-plane line F–F' in FIG. 5, which shows the first embodiment and corresponds to FIG. 19. FIG. 18 is a cross-sectional view similar to FIG. 17 with the cutting-plane lines A–A', D–D' and G–G' additionally shown. FIG. 19 is a cross-sectional view showing the telephoto-end state with the maximum focal length taken along the cutting-plane line A–A' shown in FIG. 18. FIG. 20 is a cross-sectional view showing the wide-angle-end state taken along the same cutting-plane line as in FIG. 19. FIG. 21 is a cross sectional-view taken along the cutting-plane line G–G' in FIG. 18. FIG. 22 is a cross-sectional view taken along the cutting-plane line D–D' in FIG. 18. FIG. 23 is a schematic view of essential components of the lens barrel, in the collapsed state, of the digital camera according to this embodiment, which are viewed along the optical axis. FIG. 23 is a cross-sectional view taken by cutting the arrangement shown in FIG. 24 described later along a line corresponding to the cutting-plane line E–E' in FIG. 11, which shows the first embodiment and corresponds to FIG. 24. FIG. 24 is a cross-sectional view taken by cutting the arrangement shown in FIG. 23 along a line corresponding to the cutting-plane line C–C' in FIG. 10 which shows the first embodiment and corresponds to FIG. 23. FIG. 25 is a cross-sectional view taken by cutting the arrangement shown in FIG. 23 along a line corresponding to the cutting-plane line B–B' in FIG. 10 which shows the first embodiment and corresponds to FIG. 23.

In the first embodiment described above, viewed along the optical axis, the shutter unit 179 is provided forward of the rear group guiding frame 170, and the rear group holding frame 172 is provided backward of the rear group guiding frame 170. However, according to this embodiment, the shutter unit 179 is fixed to the back side of the rear group guiding frame 170, and the rear group holding frame 172 is provided forward of the rear group guiding frame 170.

Furthermore, as shown in FIGS. 19 and 23, the digital camera according to this embodiment has a brush 1110a for wiping the front face of the rear lens group 112 located backward of a front lens group holding frame 1110 and a brush 172a for wiping the back face of the rear lens group 113 located forward of the rear lens group holding frame 172. The brushes provided on the focusing lens 113 and CCD 120 are the same as those in the first and second embodiments, and thus, descriptions thereof will be omitted.

Furthermore, unlike the second embodiment, according to this embodiment, the retracted position of the rear lens group 112 lies in the front lens group side space 106, as shown in FIG. 24.

Furthermore, according to this embodiment, the protrusion 209 protruding from the wall member 103 shown in FIG. 7, which is used in the first embodiment, is not provided, and the lever member 175 that engages therewith is not provided.

Instead, according to this embodiment, there are provided a stepping motor 190, a driving gear fixed to a rotation shaft of the stepping motor 190 for transmitting the rotational driving force of the stepping motor 19b to the rear group holding frame 172, a transmission gear 192 for transmitting the driving force of the driving gear, a receiving gear 193 fixed to the rear group holding frame 172, and a photo interrupter 194 for detecting that the rear group holding frame 172 is located on the optical axis.

While FIG. 23 shows only the brush 122a provided along the left edge of the CCD guiding frame 122 and the brush 134b provided along the right half of the circumference of the focusing lens 113, the brush 134a is provided at the corresponding area on the back side thereof. In addition, FIG. 23 shows the brush 172b provided along the left half of the circumference of the rear lens group 112. The brush 1110a provided on the front group guiding frame 1110 is not shown in FIG. 23 for the simplicity of illustration.

The rotational driving force of the stepping motor 190 is transmitted to the rear group holding frame 172 via the driving gear 191, the transmission gear 192 and the receiving gear 193 to cause the rear group holding frame 172 to rotate about the rotation shaft 173, thereby rotating the rear lens group 112 between a position on the optical axis and the retracted position. Again, in this embodiment, the coil spring 174 (see FIG. 19) is provided surrounding the rotation shaft 173, and the biasing force of the coil spring 174 allows the rear lens group 112 to stably remain at the position on the optical axis.

As shown in this embodiment, besides the driving source for collapsing and extending the lens barrel, there may be provided a driving source that makes the rear group holding frame 172 rotate, thereby causing rotation of the rear lens group 112.

As for the digital camera according to this embodiment described above, the thickness thereof in the collapsed state is reduced by retracting the rear lens group 112 in the front lens group side space 106 at the side of the front lens group 111 and retracting the focusing lens 113 in the recess section 104 at the side of the CCD 120 when the lens barrel is collapsed, as shown in FIG. 24.

In the digital camera, as shown in FIGS. 19 and 23, when the rear lens group 112 and the focusing lens 113 are retracted from the optical axis or advanced onto the optical axis, the back face of the front lens group 111 is wiped by the brush 172a on the front side of the rear group holding frame 172, and the front face of the rear lens group 112 is wiped by the brush 1110a provided on the back side of the front group holding frame 1110. The brush 134a on the front side of the focusing lens holding frame 134 wipes the back face of the shutter 179b of the shutter unit 179 fixed to the rear group guiding frame 170, and the brush 134b on the back side of the focusing lens holding frame 134 wipes the front face of the LPF 21. In addition, the brush 122a on the CCD guiding frame 122 wipes the back face of the focusing lens 113.

Therefore, the digital camera according to this embodiment can be made thinner than conventional in the collapsed state and is improved in suppression of degradation of image quality due to dust or the like in the lens barrel.

Now, a digital camera according to a fourth embodiment of the present invention will be described.

FIG. 26 is a cross-sectional view of essential components of the lens barrel, in the extended state, of the digital camera according to this embodiment, which corresponds to FIG. 19 concerning the third embodiment.

This embodiment differs from the third embodiment only in that an adhesive tape 200 is attached to a left area of the back face of the shutter unit 179. Thus, the following description will be made only concerning this point.

According to this embodiment, as in the third embodiment, when the lens barrel is collapsed, the back face of the shutter 179b of the shutter unit 179 fixed to the rear group guiding frame 170 is wiped by the brush 134a on the front side of the focusing lens holding frame 134. After wiping the back face of the shutter 179b, the brush 134a comes into contact with the adhesive tape 200 on the left area of the back face of the shutter unit 179, and any dust or the like on the brush 134a is removed onto the adhesive tape 200. Thus, according to this embodiment, any dust or the like once removed from the back face of the shutter 179b and adhering to the brush 134a can be removed from the brush 134a, so that the dust or the like removed from the back face of the shutter 179b when the lens barrel is collapsed can be prevented from being brought by the brush 134a onto the back face of the shutter 179b again.

Therefore, the digital camera according to this embodiment can be made thinner than conventional in the collapsed state and is further improved in suppression of degradation of image quality due to dust or the like in the lens barrel. In the description of this embodiment, the adhesive tape 200 for removing dust or the like from the brush is attached to the left area of the back face of the shutter unit 179. However, the adhesive tape may be attached to any other area in the trajectory drawn by the brush that wipes the back face of the shutter unit 179 when the lens barrel is collapsed or extended.

In addition, in this embodiment, the adhesive tape for removing dust or the like on the brush that wipes the back face of the shutter unit 179 is provided. However, a brush for wiping the front face of the shutter unit 179 or other optical members may be provided, and an adhesive tape for removing dust or the like on the brush may be provided.

In the embodiments described above, the shutter unit 179 is a PLZT one. However, the shutter unit may be a liquid-crystal one. Furthermore, the shutter unit is not necessarily required to use such an electrooptic element and may be a mechanical shutter unit, which mechanically controls the aperture or shutter speed, or an iris shutter (or an iris diaphragm) unit, which advances or retracts an iris having a predetermined aperture onto or from the optical axis.

In the above-described embodiments, the extraneous matter is removed by contacting the optical member to be cleaned. Now, there will be described a cleaning member that removes extraneous matter adhering to an optical member to be cleaned without contacting the optical member.

FIG. 27 shows a non-contact type of cleaning member.

FIG. 27 is the same as FIG. 5 except that electrets 1220a, 1340a, 1340b, 1720b, and 1700b are provided instead of the contact type of brushes. Each electret removes extraneous matter adhering to an optical member by charging its surface for a predetermined amount of electric charge and by attracting the extraneous matter using the electrostatic force. The electret 1220a is provided on the front side of a CCD guiding frame 122 and cleans the back face of a focusing lens 113. The electret 1340a is provided on the front side of a focusing lens holding frame 134 and cleans the back face of a rear lens group 112. The electret 1340b is provided on the back face of the focusing lens holding frame 134 and cleans the surface of a LPF 121. The electret 1720b is provided on the back face of a rear group holding frame 172 and cleans the front face of the focusing lens 113. The electret 1700b is provided at a rear group guiding frame 170 and cleans the front face of the rear lens group 112. Electret is obtained by heating and melting a polymeric material (ebonite, polytetrafluoroethylene, polypropylene, Mylar, etc.) or the like which is difficult to electrify, and subsequently by solidifying the material between electrodes while applying a high direct voltage thereto so that the material is polarized as its surfaces being in contact with the electrodes become positively or negatively charged. The electret thus obtained remains semi-permanently polarized (divided between positive electricity and negative electricity). There are known various methods of charging, such as a method of polarizing a material by applying a high direct voltage thereto, a method of causing ions by applying a high direct voltage to needle electrodes and applying the ions to a material, a method of charging a material by a pulse discharge, and the like (see http://www.aist.go.jp/NIRE/publica/news-2000/2000-12-1.htm, for example). If extraneous matter adhering to an optical member is removed without contacting the optical member in this way, it is possible to prevent the extraneous matter being already adhered to the optical member from soiling and damaging the optical member by rubbing against the optical member.

Also, there has been described the embodiment adopting the adhesive tape 200 that removes the extraneous matter being removed from the optical member and adhering to the cleaning member by bringing the extraneous matter in contact with the adhesive tape 200. However, the extraneous matter adhering to the cleaning member may be removed in a non-contact manner.

FIG. 28 shows an example in which extraneous matter adhering to a cleaning member is removed in a non-contact manner.

FIG. 28 shows an electret 201 provided on the back face of a shutter unit 179 and cleans, in a non-contact manner, extraneous matter adhering to a brush 134a that is provided on the front face of a focusing lens holding frame 134 and cleans the back face of a shutter of the shutter unit 179 fixed to a rear group guiding frame 170. The extraneous matter adhering to a cleaning member may be removed by bringing the extraneous matter in contact with an adhesive tape, but may be removed by a non-contact means such as electret that uses the electrostatic force as described above.

Furthermore, while both the diaphragm and the shutter are provided in these embodiments, one unit serving as both diaphragm and shutter may be used. In this regard, the same holds true for the shutter unit using an electrooptic element, and one unit using an electrooptic element and serving both as diaphragm and shutter may be used. Furthermore, while the LPF 121 and the CCD guiding frame 122 have been described as being flush on the front with each other, the present invention is not limited thereto.

In the above description of the embodiments, the digital camera has been assumed as a digital camera for still picture, in particular. However, the present invention can be equally applied to digital cameras for moving picture or digital cameras for both still picture and moving picture. Furthermore, in the above description, the optical-member retraction/advancement mechanism is composed of a guiding frame for positioning the optical member along the optical axis for picture taking and a holding frame rotatably pivotally supported on the guiding frame. However, the present invention is not limited thereto, and any mechanism can be used which retracts any of optical members from the optical axis when the lens barrels is collapsed and advances the retracted optical member when the lens barrels is extended.

Furthermore, in the above description of the embodiments, adjacent two of optical members wipe each other. However, the present invention is not limited thereto, and it is only essential that at least one of the optical members is wiped as a result of retracting or advancing the optical member by the optical-member retraction/advancement mechanism.

Furthermore, in the above description of the embodiments, the retracted position for the lens groups, into which the lens groups are retracted from the optical axis when the lens barrel is collapsed, are located at the side of the front lens group and at the side of the CCD.

Furthermore, in the above description of the embodiments, when the lens barrel is collapsed, the lens groups are retracted from the optical axis into the retracted positions located at the sides of the front lens group and CCD. However, the lens groups may be retracted into any space, as far as it contributes to reduction of the thickness of the digital camera.

Furthermore, the embodiments described above relate to digital cameras. However, the present invention is not exclusively applied to digital cameras but can be widely applied to cameras that use silver films for taking pictures or other types of photographic apparatus having a camera function. The present invention can also be applied to a lens barrel itself, such as an interchangeable lens.

What is claimed is:

1. A photographic apparatus that captures object light and generates an image signal, comprising:
    a picture-taking optical system that has a plurality of optical members including a plurality of lens groups; and
    a lens barrel that houses the picture-taking optical system and is capable of being extended or collapsed,
    wherein the lens barrel has:
    an optical-member advancement/retraction mechanism that retracts any of the plurality of optical members from an optical axis for picture taking when the lens barrel is collapsed, and advances the optical member, which is retracted when the lens barrel is collapsed, onto the optical axis for picture taking when the lens barrel is extended; and
    a cleaning member that cleans at least one of the optical member and one of the plurality of optical members which is adjacent to the optical member as a result of retracting or advancing the optical member by the optical-member retraction/advancement mechanism.

2. The photographic apparatus according to claim 1, wherein the cleaning member cleans both the optical member retracted or advanced by the optical-member advancement/retraction mechanism and the one of the plurality of optical members which is adjacent to the optical member.

3. The photographic apparatus according to claim 1, wherein the optical-member advancement/retraction mechanism advances or retracts any one of the plurality of lens groups excluding a front lens group, which is located at the forefront to an object.

4. The photographic apparatus according to claim 1, wherein the optical-member advancement/retraction mechanism advances or retracts, of the plurality of optical members, a light quantity controlling member that controls the quantity of object light passing therethrough.

5. The photographic apparatus according to claim 1, wherein the one of the plurality of optical members which is adjacent to the optical member retracted or advanced by the optical-member advancement/retraction mechanism is one of the plurality of lens groups.

6. The photographic apparatus according to claim 1, wherein the one of the plurality of optical members which is adjacent to the optical member retracted or advanced by the optical-member advancement/retraction mechanism is a light quantity controlling member that controls the quantity of object light passing therethrough.

7. The photographic apparatus according to claim 1, wherein the one of the plurality of optical members which is adjacent to the optical member retracted or advanced by the optical-member advancement/retraction mechanism is an optical member that is disposed in front of an image pickup device that receives object light through the picture-taking optical system and generates an image signal.

8. The photographic apparatus according to claim 7, wherein the optical member disposed in front of the image pickup device has a flat surface.

9. The photographic apparatus according to claim 1, wherein the optical-member advancement/retraction mechanism comprises: an optical member guiding frame that moves along the optical axis for picture taking and positions the optical member retracted or advanced by the optical member advancement/retraction mechanism along the optical axis; and an optical member holding frame that holds the optical member and is rotatably pivotally supported on the optical member guiding frame, and
    wherein at least one of the optical member guiding frame and the optical member holding frame has the cleaning member.

10. The photographic apparatus according to claim 1, wherein the cleaning member cleans an optical member to be cleaned by contacting the optical member to be cleaned.

11. The photographic apparatus according to claim 1, wherein the cleaning member attracts extraneous matter adhering to an optical member to be cleaned without contacting the optical member to be cleaned.

12. The photographic apparatus according to claim 1, further comprising a remover that removes extraneous matter adhering to the cleaning member during cleaning of an optical member from the cleaning member.

13. A lens barrel that houses a picture-taking optical system having a plurality of optical members including a plurality of lens groups and is capable of being extended or collapsed, comprising:
   an optical-member advancement/retraction mechanism that retracts any of the plurality of optical members from an optical axis for picture taking when the lens barrel is collapsed, and advances the optical member, which is retracted when the lens barrel is collapsed, onto the optical axis for picture taking when the lens barrel is extended; and
   a cleaning member that cleans at least one of the optical member and one of the plurality of optical members which is adjacent to the optical member as a result of retracting or advancing the optical member by the optical-member retraction/advancement mechanism.

14. The lens barrel according to claim 13, wherein the cleaning member cleans both the optical member retracted or advanced by the optical-member advancement/retraction mechanism and the one of the plurality of optical members which is adjacent to the optical member.

15. The lens barrel according to claim 13, wherein the optical-member advancement/retraction mechanism comprises: an optical member guiding frame that moves along the optical axis for picture taking and positions the optical member retracted or advanced by the optical member advancement/retraction mechanism along the optical axis; and an optical member holding frame that holds the optical member and is rotatably pivotally supported on the optical member guiding frame, and
   wherein at least one of the optical member guiding frame and the optical member holding frame has the cleaning member.

16. The lens barrel according to claim 13, wherein the cleaning member cleans an optical member to be cleaned by contacting the optical member to be cleaned.

17. The lens barrel according to claim 13, wherein the cleaning member attracts extraneous matter adhering to an optical member to be cleaned without contacting the optical member to be cleaned.

18. The lens barrel according to claim 13, further comprising a remover that removes extraneous matter adhering to the cleaning member during cleaning of an optical member from the cleaning member.

* * * * *